(12) United States Patent
Lu et al.

(10) Patent No.: US 12,436,342 B2
(45) Date of Patent: *Oct. 7, 2025

(54) FIBER OPTIC CONNECTORS AND FIBER OPTIC CONNECTION SYSTEMS

(71) Applicant: CommScope Technologies LLC, Hickory, NC (US)

(72) Inventors: Yu Lu, Eden Prairie, MN (US); Ryan Kostecka, Waconia, MN (US)

(73) Assignee: CommScope Technologies LLC, Claremont, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/585,310

(22) Filed: Feb. 23, 2024

(65) Prior Publication Data

US 2024/0329330 A1    Oct. 3, 2024

Related U.S. Application Data

(63) Continuation of application No. 17/430,455, filed as application No. PCT/US2020/017681 on Feb. 11, 2020, now Pat. No. 11,921,329.

(60) Provisional application No. 62/817,064, filed on Mar. 12, 2019, provisional application No. 62/804,624, filed on Feb. 12, 2019.

(51) Int. Cl.
G02B 6/38    (2006.01)
(52) U.S. Cl.
CPC .......... G02B 6/3849 (2013.01); G02B 6/3825 (2013.01); G02B 6/3831 (2013.01); G02B 6/3887 (2013.01)
(58) Field of Classification Search
CPC ....................................................... G02B 6/38
See application file for complete search history.

(56) References Cited

U.S. PATENT DOCUMENTS

| | | |
|---|---|---|
| 7,090,407 B2 | 8/2006 | Melton et al. |
| 7,467,896 B2 | 12/2008 | Melton et al. |
| 7,614,797 B2 | 11/2009 | Lu et al. |
| 7,744,288 B2 | 6/2010 | Lu et al. |
| 8,556,520 B2 | 10/2013 | Elenbaas et al. |
| 9,557,493 B2 | 1/2017 | Wu et al. |
| 10,359,577 B2 | 7/2019 | Dannoux et al. |
| 11,921,329 B2 | 3/2024 | Lu et al. |

(Continued)

FOREIGN PATENT DOCUMENTS

| | | |
|---|---|---|
| CN | 108459378 | 8/2018 |
| EP | 2772778 | 1/2016 |
| WO | 2015028433 | 3/2015 |

OTHER PUBLICATIONS

Extended European Search Report for European Patent Application No. 20755407.2 mailed Oct. 6, 2022, 9 pages.

(Continued)

*Primary Examiner* — Michael Stahl
(74) *Attorney, Agent, or Firm* — Merchant & Gould P.C.

(57) ABSTRACT

The present disclosure relates to a system for making or assembling fiber optic connectors that allows a pre-terminated fiber optic cable to be made compatible with any number of different styles or types of fiber optic connectors or fiber optic adapters. The present disclosure also relates to a fiber optic connector having first and second pieces connected to twist-to-engage interface and also including a rotational interlock. The present disclaimer relates to a fiber optic connector having a boot that mounts in multiple different axial positions.

17 Claims, 22 Drawing Sheets

(56) References Cited

U.S. PATENT DOCUMENTS

| | | |
|---|---|---|
| 2009/0162016 A1 | 6/2009 | Lu et al. |
| 2016/0209599 A1 | 7/2016 | Van Baelen et al. |
| 2017/0123163 A1 | 5/2017 | Lu et al. |
| 2017/0343741 A1 | 11/2017 | Coenegracht et al. |
| 2018/0259721 A1 | 9/2018 | Bund et al. |
| 2022/0299713 A1 | 9/2022 | Lu et al. |

OTHER PUBLICATIONS

International Search Report and Written Opinion of the International Searching Authority for International Patent Application No. PCT/US2020/017681 mailed Jun. 25, 2020, 14 pages.

FIBER OPTIC CONNECTORS AND FIBER OPTIC CONNECTION SYSTEMS

CROSS-REFERENCE TO RELATED APPLICATIONS

This application is a continuation of application Ser. No. 17/430,455, filed on Aug. 12, 2021, now U.S. Pat. No. 11,921,329, which is a National Stage Application of PCT/US2020/017681, filed on Feb. 11, 2020, which claims the benefit of U.S. Patent Application Ser. No. 62/817,064, filed on Mar. 12, 2019, and claims with benefit of U.S. Patent Application Ser. No. 62/804,624, filed on Feb. 12, 2019, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to systems for making fiber optic connectors, and fiber optic connectors made from such systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by U.S. Pat. Nos. 7,467,896; 7,744,288 and 8,556,520.

It will be appreciated that a number of different types of ruggedized fiber optic connectors are available for outside environmental use. International Publication No. WO2015/028433 discloses a system for making fiber optic connectors in which a number of different ruggedized outer assemblies having different form-factors or configurations can be selectively mounted on a pre-terminated cable such that the pre-terminated cable can be customized to be compatible with a particular style or type of fiber optic connector or fiber optic adapter.

SUMMARY

Certain aspects of the present disclosure relate to a system for making or assembling fiber optic connectors that allows a pre-terminated fiber optic cable to be made compatible with any number of different styles or types of fiber optic connectors or fiber optic adapters. In certain examples, the system allows the selection of different shrouds, outer housings, outer fasteners and the like for mounting over a connector core that pre-terminates the end of a fiber optic cable. In certain examples, the different shrouds or outer housings can include different form factors, different keying arrangements, different shapes, and the like. Further, the shrouds can be used in combination with different fastening elements for fastening the final assembled connector to another fiber optic connector or a fiber optic adapter. Example fastening structures can include turn-to-engage fasteners (e.g., threaded fasteners and bayonet-style fasteners), slideable fasteners and snap-fit fasteners. In certain examples, different sealing arrangements can be provided on the different shrouds or housings. In certain examples, the outer shrouds or housings or fasteners can be part of outer connector assemblies that are preferably hardened/ruggedized. Certain aspects of the present disclosure relate to features that facilitate the proper and secure assembly of fiber optic connectors made from systems in accordance with the principles of the present disclosure. Other aspects relate to features for ensuring reliable connections are made between various components of the connector, and features for facilitating accessing various components of the connectors.

Another aspect of the present disclosure relates to a retention arrangement for retaining a shroud over a connector core. The retention arrangement can include a shroud retainer that interfaces with the shroud via a turn-to-engage interface. The retention arrangement can also include features for ensuring that the shroud retainer is fully secured to the shroud, and for ensuring that the shroud retainer does not unintentionally disengage from the shroud after the turn-to-engage interfaces have been engaged with one another. In certain examples, the retaining arrangement provides an audible noise such as a clicking noise once the shroud retainer and the shroud have been fully secured together. In one example, the retaining arrangement includes interlocking members such as teeth or ribs that inhibit the uncoupling of the shroud retainer from the shroud. In certain examples, coupling between the shroud and the shroud retainer can be permanent, or can be sufficiently robust as to ensure that the shroud retainer and the shroud do not unintentionally disengage from one another.

Another aspect of the present disclosure relates to a connector configuration including a boot that is mountable in first and second positions on a shroud retainer. The boot is preferably a flexible structure adapted to provide strain relief at an interface between a fiber optic cable and a fiber optic connector. Often, the boot has a tapered, flexible configuration. According to aspects of the present disclosure, the boot is movable between a first axial position on the shroud retainer in which the boot can readily be rotated relative to a fiber optic cable, and a second axial position where rotation of the boot relative to the fiber optic cable is more difficult as compared to when the boot is in the first position. When the boot is in the first position, the boot can be used to grasp the shroud retainer for use in rotating the shroud retainer relative to the cable for securing a shroud around a connector core. Additionally, when the boot is in the first position, the boot can readily be disengaged from the shroud retainer to provide enhanced access to the shroud retainer for rotating the shroud retainer relative to the connector core to secure the shroud retainer to a shroud. In certain examples, when the boot is moved to the second position relative to the shroud retainer, the boot and the shroud retainer interconnect relative to one another via a snap-fit interlock thereby rendering the boot more difficult to remove from the shroud retainer as compared to when the boot is in the first position.

Another aspect of the present disclosure relates to a fiber optic connector assembly including a connector core having a front plug end positioned opposite from a rear cable attachment end. The fiber optic connector assembly also includes a fiber optic cable attached to the rear cable attachment end of the connector core. The fiber optic cable includes a jacket. The fiber optic connector assembly further includes an optical fiber structure having a first section routed longitudinally through the jacket of the fiber optic cable and a second section routed through the connector core. The second section defines a fiber tip at the front plug end of the connector core. The fiber optic connector assembly further includes a shroud that mounts over the connector core. The shroud has a front keying end and a rear securement end. The rear securement end includes a first rotational mechanical interface (e.g., a turn-to-engage interface) and a first rotational locking mechanical interface. The fiber optic connector assembly additionally includes a shroud retainer for retaining the shroud on the connector core. The shroud retainer mounts over the connector core and includes a front end including a second rotational mechanical interface (e.g., a turn-to-engage interface) and a second rotation locking mechanical interface. The second rotational mechanical interface is adapted to rotationally engage and mate with the first rotational mechanical interface to secure the shroud and the shroud retainer together. Once the first and second rotational mechanical interfaces are rotationally engaged and mated, the first and second rotation locking mechanical interfaces interlock to inhibit the unintentional decoupling of the first and second rotational mechanical interfaces.

Another aspect of the present disclosure relates to a fiber optic connector assembly including a connector core having a front plug end positioned opposite from a rear cable attachment end. The fiber optic connector assembly also includes a fiber optic cable attached to the rear cable attachment end of the connector core. The fiber optic cable includes a jacket. The fiber optic connector assembly further includes an optical fiber structure having a first section routed longitudinally through the jacket of the fiber optic cable and a second section routed through the connector core. The second section defines a fiber tip at the front plug end of the connector core. The fiber optic connector assembly further includes a shroud that mounts over the connector core. The shroud has a front keying end and a rear securement end. The rear securement end includes a first rotational mechanical interface. The fiber optic connector assembly additionally includes a shroud retainer for retaining the shroud on the connector core. The shroud retainer mounts over the connector core and includes a front end having a second rotational mechanical interface. The second rotational mechanical interface is adapted to rotationally engage and mate with the first rotational mechanical interface to secure the shroud and the shroud retainer together. The fiber optic connector assembly also includes a boot that mounts on a rear end of the shroud retainer. The boot is mountable in first and second axial positions relative to the shroud retainer. The boot is moved forwardly relative to the shroud retainer when moved from the first axial position to the second axial position. The boot is easier to rotate relative to the fiber optic cable when the boot is in the first axial position as compared to the second axial position.

A further aspect of the present disclosure relates to a fiber optic connector assembly system including a connector core having a front plug end positioned opposite from a rear cable attachment end. The fiber optic connector assembly system also includes a fiber optic cable attached to the rear cable attachment end of the connector core. The fiber optic cable includes a jacket. The fiber optic connector assembly system further includes an optical fiber structure having a first section routed longitudinally through the jacket of the fiber optic cable and a second section routed through the connector core. The second section defines a fiber tip at the front plug end of the connector core. The fiber optic connector assembly system additionally includes a plurality of shrouds each configured to mount individually over the connector core. The shrouds each have a front keying end and a rear securement end. The front keying ends of the different shrouds have different keying configurations. The rear securement ends each include a first rotational mechanical interface and a first rotational locking mechanical interface. The fiber optic connector assembly system also includes a shroud retainer for retaining a selected one of the shrouds on the connector core. The shroud retainer mounts over the connector core and includes a front end including a second rotational mechanical interface and a second rotational locking mechanical interface. The second rotational mechanical interface is adapted to rotationally engage and mate with the first rotational mechanical interface of the selected shroud and the shroud retainer together. Once the first and second rotational mechanical interfaces are rotationally engaged and mated, the first and second rotation locking mechanical interfaces interlock to inhibit the unintentional decoupling of the first and second rotational mechanical interfaces.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
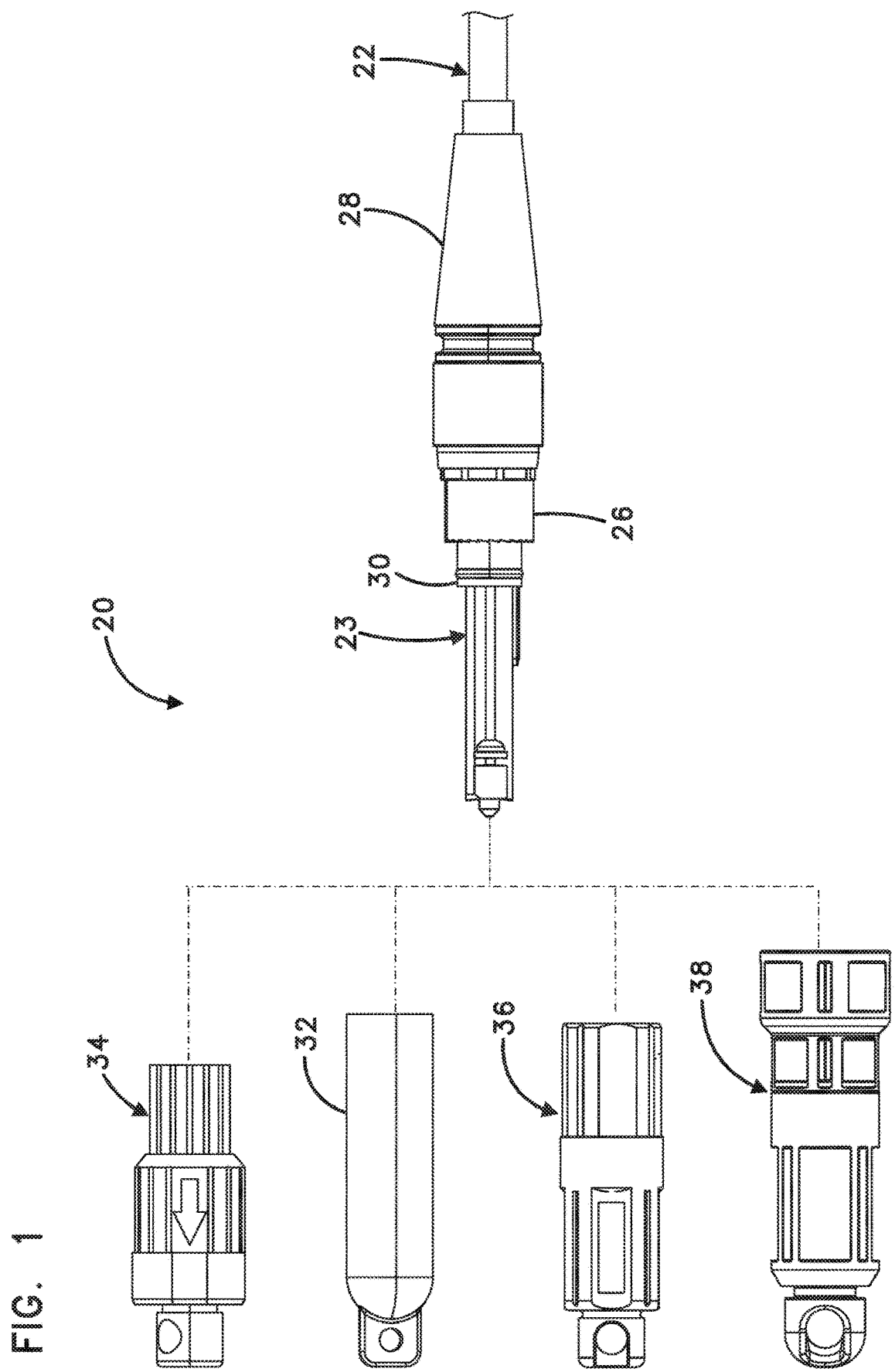
FIG. 1 illustrates a fiber optic connector system in accordance with the principles of the present disclosure.
Figure 2:
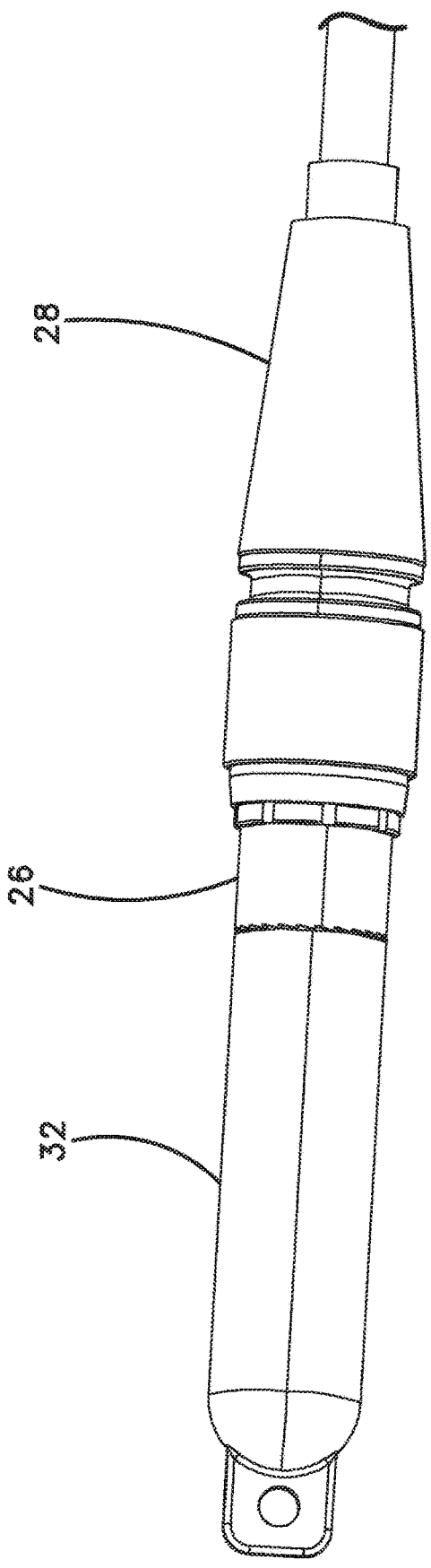
FIG. 2 illustrates a connector core of the system of FIG. 1 coupled to a dust cap.

FIG. 1 illustrates an example fiber optic connector assembly system 20 in accordance with the principles of the present disclosure. The fiber optic connector assembly system 20 allows a pre-terminated fiber optic cable 22 to be readily configured in one of any number of different connector configurations. The different connector configurations can include connector configurations having different connector housings/shrouds, different keying arrangements for keying with different styles or types of fiber optic adapters or fiber optic connectors, different fasteners compatible with different fiber optic adapters and fiber optic connectors, and the like. In certain examples, the different connector arrangements can include a plurality of different hardened (i.e., ruggedized) connector arrangements adapted to be compatible with different styles or types of hardened fiber optic connectors or hardened fiber optic adapters. It will be appreciated that the pre-terminated cable 22 can be fitted with a selected one of the different outer connector arrangements either in the field or in the factory to render the pre-terminated fiber optic cable compatible with a particular type of connector system (e.g., the pre-terminated fiber optic cable with the selected connector assembly mounted thereon is compatible and mateable with a particular fiber optic adapter style and/or a particular fiber optic connector style).

Referring still to FIG. 1, the fiber optic connector assembly system 20 includes a connector core 23 terminating one end of the fiber optic cable 22. A shroud retainer 26 is rotatably mounted on the connector core 23, and a strain relief boot 28 is mounted on the shroud retainer 26. A seal 30 is mounted on the connector core 23 in front of the shroud retainer 26. The fiber optic connector assembly system 20 also includes a number of different components, arrangements, assemblies or the like that can be selected and individually mounted on the connector core 23 and secured to the connector core 23 by the shroud retainer 26. The seal 30 can be configured to seal against the components, arrangements or assemblies when the components, arrangements or assemblies are mounted on the core 23. The various components, arrangements, and assemblies are depicted as including a dust cap 32, a first hardened connector shroud and fastener arrangement 34, a second hardened connector shroud and fastener arrangement 36, and a third hardened connector shroud and fastener arrangement 38.

It will be appreciated that the dust cap 32 can be secured over the connector core 23 to protect the connector core 23 and the terminated optical fiber or fibers supported thereby prior to installing one of the first, second, or third arrangements 34, 36 or 38 on the connector core 23. It will be appreciated that the dust cap 32 is required to be removed from the connector core 23 prior to mounting the selected one of the arrangements 34, 36 or 38 over the connector core 23.

A first fiber optic connector assembly 40 (shown at FIGS. 7-9) that results when the first hardened connector shroud and fastener arrangement 34 is mounted on the connector core 23 is compatible and mateable with a FastConnect™ fiber optic adapter port sold by Huawei Technologies Company Ltd. (see U.S. Pat. No. 9,557,493, which is hereby incorporated by reference in its entirety). A second fiber optic connector assembly 42 that results when the second hardened connector shroud and fastening arrangement 36 is mounted on the connector core 23 (see FIGS. 10-12) is configured to be compatible with an Opti Tap™ fiber optic adapter sold by Corning Cable Systems LLC (e.g., see U.S. Pat. No. 7,090,407, which is hereby incorporated by reference in its entirety). A third fiber optic connector assembly 44 that results from mounting the third hardened connector shroud and fastener arrangement 38 on the connector core 23 (see FIGS. 13-15) is compatible with a DLX™ fiber optic adapter sold by CommScope Incorporated (e.g., see U.S. Pat. No. 7,744,288, which is hereby incorporated by reference in its entirety.)

It will be appreciated that a fiber optic cable is pre-terminated by mounting a structure at the end of the cable that presents the optical fiber or fibers for optical connection by a de-mateable optical connection. For example, a fiber optic cable can be pre-terminated by mounting a ferrule at the end of the optical fiber or fibers of the cable in preparation for presenting the optical fiber as part of a ferruled optical connector. In other examples, a housing or other structure can be attached to the fiber optic cable and can function to align or position the optical fiber without the use of a ferrule as in the case of a ferrule-less fiber optic connector. In the depicted example, the fiber optic cable 22 is pre-terminated by mounting the connector core 23 at the end of the fiber optic cable 22 prior to assembling any of the hardened arrangements 34, 36 or 38 over the connector core 23.

Figure 3:
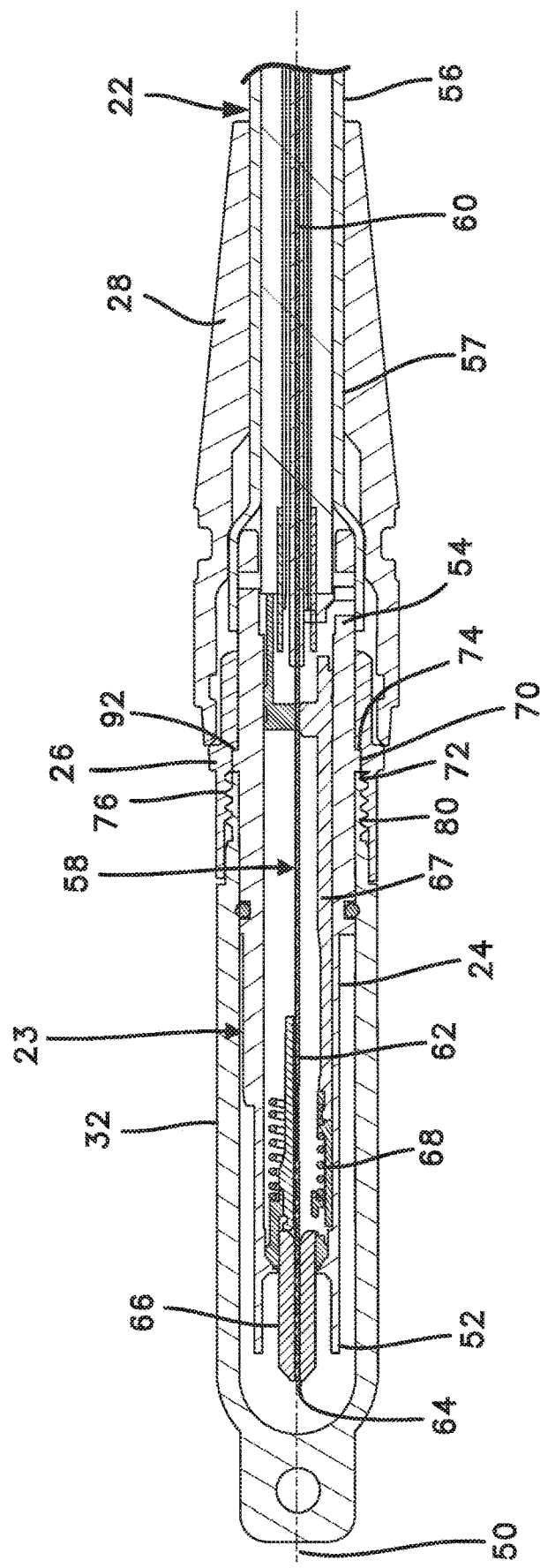
FIG. 3 is cross-sectional view of the connector core and dust cap of FIG. 2.

Referring to FIG. 3, the connector core 23 includes a connector core body 24 that is elongated along a length that extends along a longitudinal axis 50. The connector core body 24 includes a front plug end 52 positioned opposite from a rear cable attachment end 54. The front plug end 52 optionally has a form factor compatible with an SC type fiber optic connector, but could have other form factors as well such as an LC form factor. The fiber optic cable 22 is attached or secured to connector core 23 at the rear cable attachment end 54 of the connector core body 24. For example, strength members (e.g., yarn type strength members such Aramid yarn or fiberglass) can be attached to the connector core 23 at the rear cable attachment end 54 by adhesive (e.g., epoxy), crimping or other means. The fiber optic cable 22 includes an outer jacket 56. The outer jacket 56 of the fiber optic cable 22 can be secured to the cable attachment end 54 of the connector core body 24 by a sleeve 57 such as a shape memory sleeve (e.g., a heat-shrink sleeve). In certain examples, the heat-shrink sleeve can include an interior layer of adhesive for bonding the heat-shrink sleeve to the outer jacket 56 and to the connector core body 24.

An optical fiber structure 58 includes a first section 60 routed longitudinally through the outer jacket 56 of the fiber optic cable and a second section 62 routed through the connector core body 24. The second section 62 of the optical fiber structure 58 defines a fiber tip 64 at the front plug end 52 of the connector core body 24. A front portion of the second section 62 of the optical fiber structure 58 is secured and supported within a ferrule 66. The ferrule 66 is spring biased in a forward direction relative to the connector core body 24 by a spring 68. An inner body 67 mounts within the connector core body 24 and includes a front end 69 that functions as a spring stop and a rear end 71 that can include structure for use in securing strength members of the fiber optic cable 22 to the connector core 23.

In the case where the ferrule 66 is directly mounted on the optical fiber of the fiber optic cable 22, the optical fiber structure 58 is an uninterrupted length of optical fiber where the first and second sections 60, 62 are all part of one continuous optical fiber. In a splice-on version of the connector arrangement, the first section 60 can be formed by a segment of optical fiber that is optically spliced (e.g., fusion spliced) to an optical fiber of the fiber optic cable 22 which forms the second section 62. In certain examples, optical splice can be located within the interior of the connector core body 24.

The connector core body 24 includes an exterior stop structure 70 (e.g., a projection, a wall, rib, a shoulder or the like) positioned adjacent the cable attachment end 54 of the connector core body 24. The stop structure 70 can include a forwardly facing positive stop surface 72 and a rearwardly facing positive stop surface 74.

Figure 4:
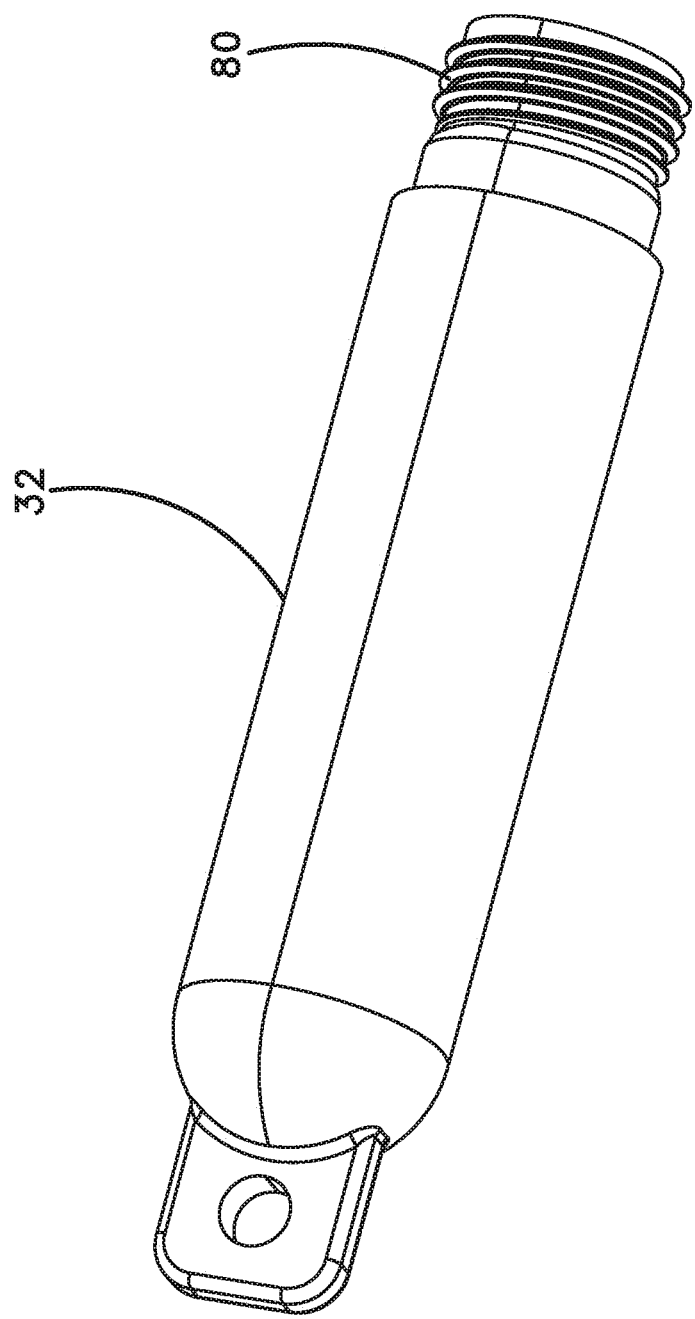
FIG. 4 is a perspective view of the dust cap of FIGS. 2 and 3.
Figure 5:
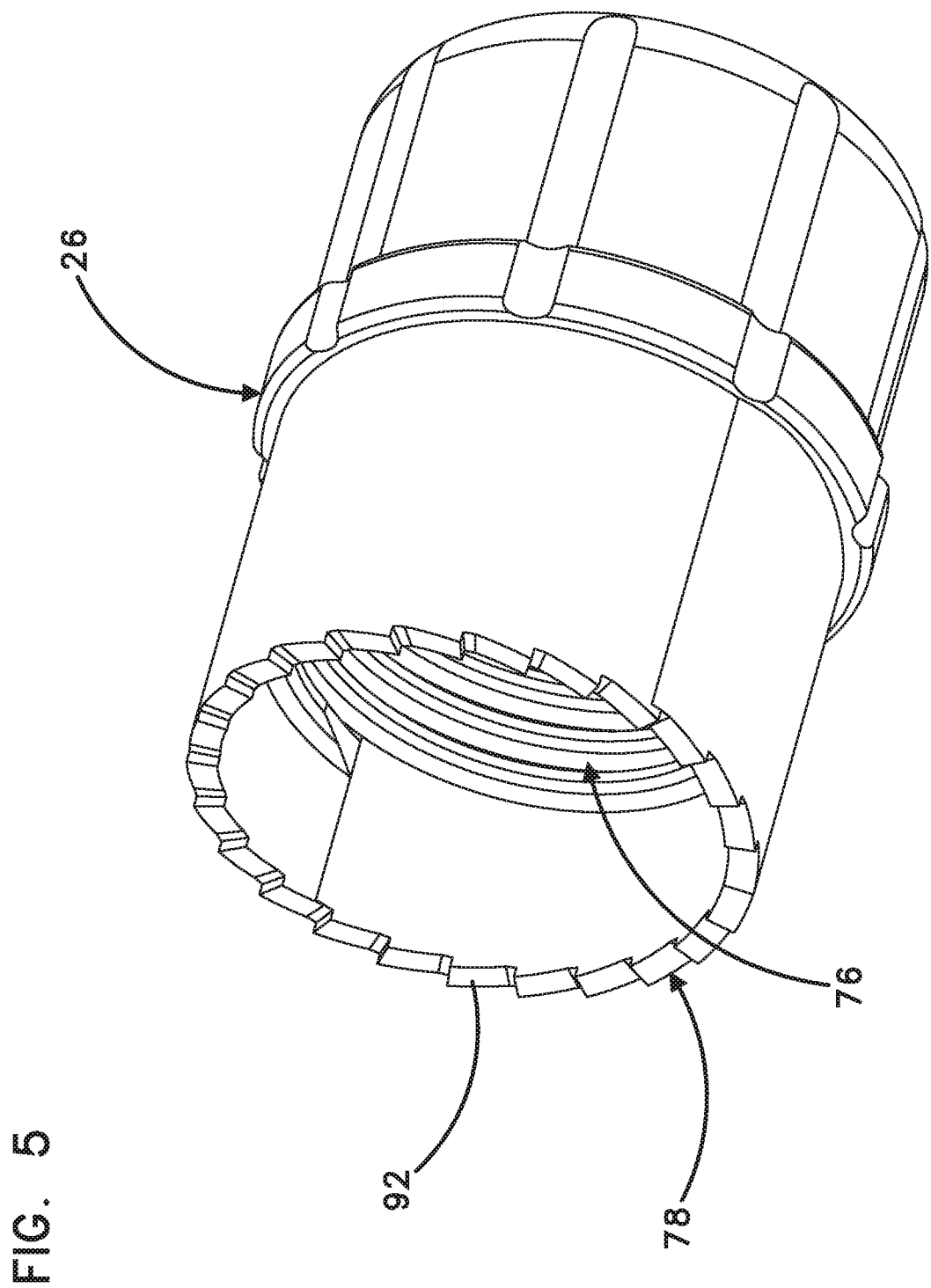
FIG. 5 is a perspective view of an example shroud retainer that mounts on the connector core of FIGS. 2 and 3.
Figure 6:
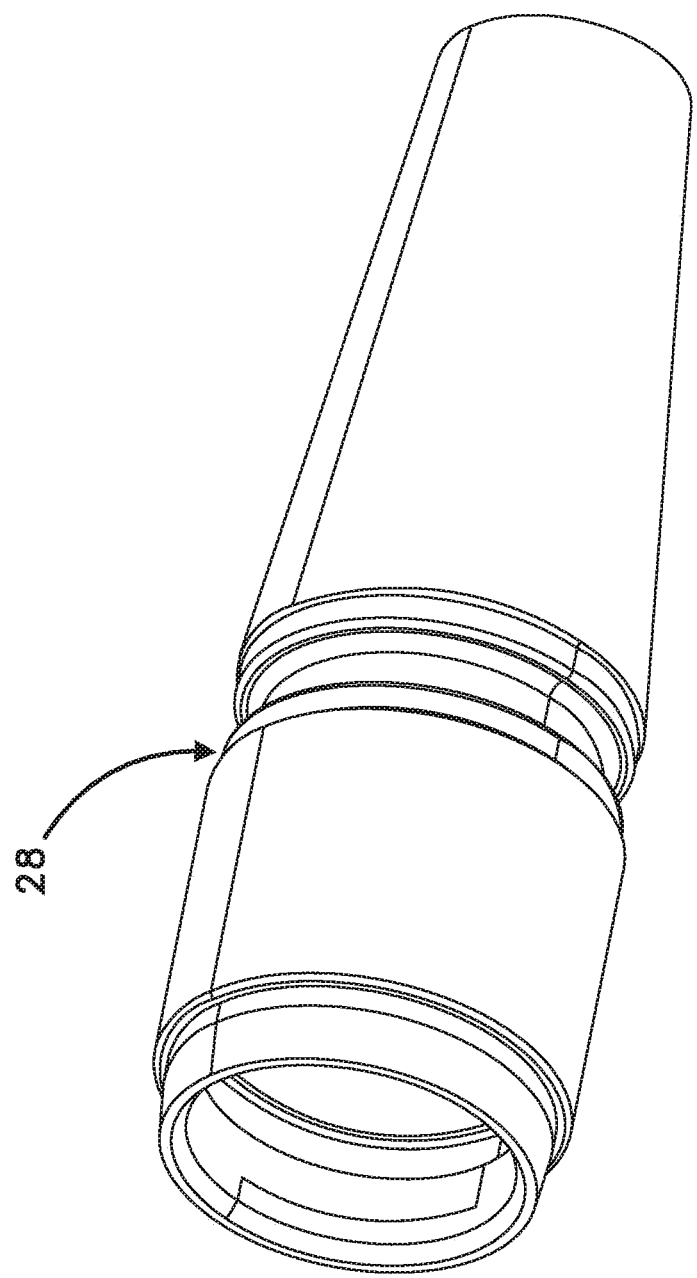
FIG. 6 is a perspective view of an example boot that mounts on the connector core of FIGS. 2 and 3.

The shroud retainer 26 mounts over the connector core body 24 adjacent the cable attachment end 54 and is mounted to be rotatable relative to the connector core body 24 about the longitudinal axis 50. Referring to FIG. 5, the shroud retainer 26 includes a rotational mechanical interface 76. The rotational mechanical interface 76 is an interface adapted to provide a turn-to-engage coupling with another rotational mechanical interface. In the depicted example, the rotational mechanical interface 26 includes internal threads within the shroud retainer 76 adapted to threadingly engage corresponding threads on another component to which it is desired to couple the shroud retainer 26. For example, the dust cap 32 includes external threads 80 (see FIG. 4) that threadingly engage with the rotational mechanical interface 76 of the shroud retainer 26 to secure the dust cap 32 over the connector core body 24. Additionally, the hardened connector shroud and fastener arrangements 34, 36, and 38 each include shrouds 82, 84, and 86 which each include rotational mechanical interfaces 88 adjacent their rear ends which are configured to engage with the rotational mechanical interface 76 in a turn-to-engage manner.

As depicted, the rotational mechanical interfaces 88 are depicted as external threads adapted to threadingly engage the internal threads of the rotational mechanical interface 76 to allow the selected one of the shrouds 82, 84 or 86 to be secured to the connector core body 24. In other examples, other types of turn-to-engage configurations can be used to form the rotational mechanical interfaces 76, 88. For example, a bayonet configuration can be utilized in which one of the rotational mechanical interface includes a bayonet pin or pins, and the other of the rotational mechanical interfaces includes a bayonet slot or slots for receiving the pin or pins. It will be appreciated that the rotational mechanical interface 76 is accessible through a front end 90 of the shroud retainer 26. In other examples, the rotational mechanical interface can be on the exterior of the retainer, and corresponding rotational interfaces on the shrouds can be inside the shrouds.

Referring to FIG. 3, the shroud retainer 26 includes an inner shoulder 92 that functions as a positive stop for stopping forward movement of the shroud retainer 26 relative to the connector core body 24. For example, the shroud retainer 26 can be inserted over the cable attachment end 54 of the connector core body 24 and move forwardly until the inner shoulder 92 abuts against the rearwardly facing positive stop surface 74 of the stop structure 70. Thus, abutment between the inner shoulder 92 and the rearwardly facing positive stop surface 74 precisely positions the shroud retainer 26 at a pre-defined axial location along the length of the connector core body 24. It will be appreciated that when the shroud retainer 26 is used to secure a component (e.g., the dust cap 32 or one of the shrouds 82, 84, 86) over the connector core body 24, a rear end of the component secured to the shroud retainer 26 can abut against the forwardly facing positive stop surface 72 to limit rearward movement of the component relative to the connector core body 24.

To secure one of the components over the connector core body 24, the component is inserted over the front plug end 52 of the connector core body 24 and moved rearwardly to a position where the component can be coupled via a turn-to-engage coupling with the shroud retainer 26. As so coupled, engagement between the inner shoulder 92 and the rearwardly facing positive stop surface 74 limits forward movement of the component and the shroud retainer 26 relative to the connector core body 24, and abutment between the rear end of the component and the forwardly facing positive stop surface 74 limits rearward movement of the component and the shroud retainer 26 relative to the connector core body 24.

When assembling any one of the shrouds 82, 84, or 86 to the connector core body 24, it is desirable to have features integrated in the mechanical coupling which ensure proper coupling is achieved between the shroud retainer 26 and the selected one of the shrouds 82, 84, 86, and to ensure that the shroud retainer 26 and the selected one of the shrouds 82, 84, or 86 do not unintentionally uncouple from one another after assembly. In this regard, the shroud retainer 26 and the shrouds 82, 84, and 86 can include rotation locking mechanical interfaces that interlock when the rotational mechanical interfaces 76, 88 are fully engaged. In certain examples, the rotation locking mechanical interfaces can make an audible noise such as a clicking noise when they engage one another such that the installer is provided with an audible indication that the rotational mechanical interfaces have been fully engaged. By interlocking the rotational locking mechanical interfaces, it is more difficult to decouple the rotational mechanical interfaces. In certain examples, the rotation locking mechanical interfaces ensure a permanent connection between the rotational mechanical interfaces.

Figure 24:
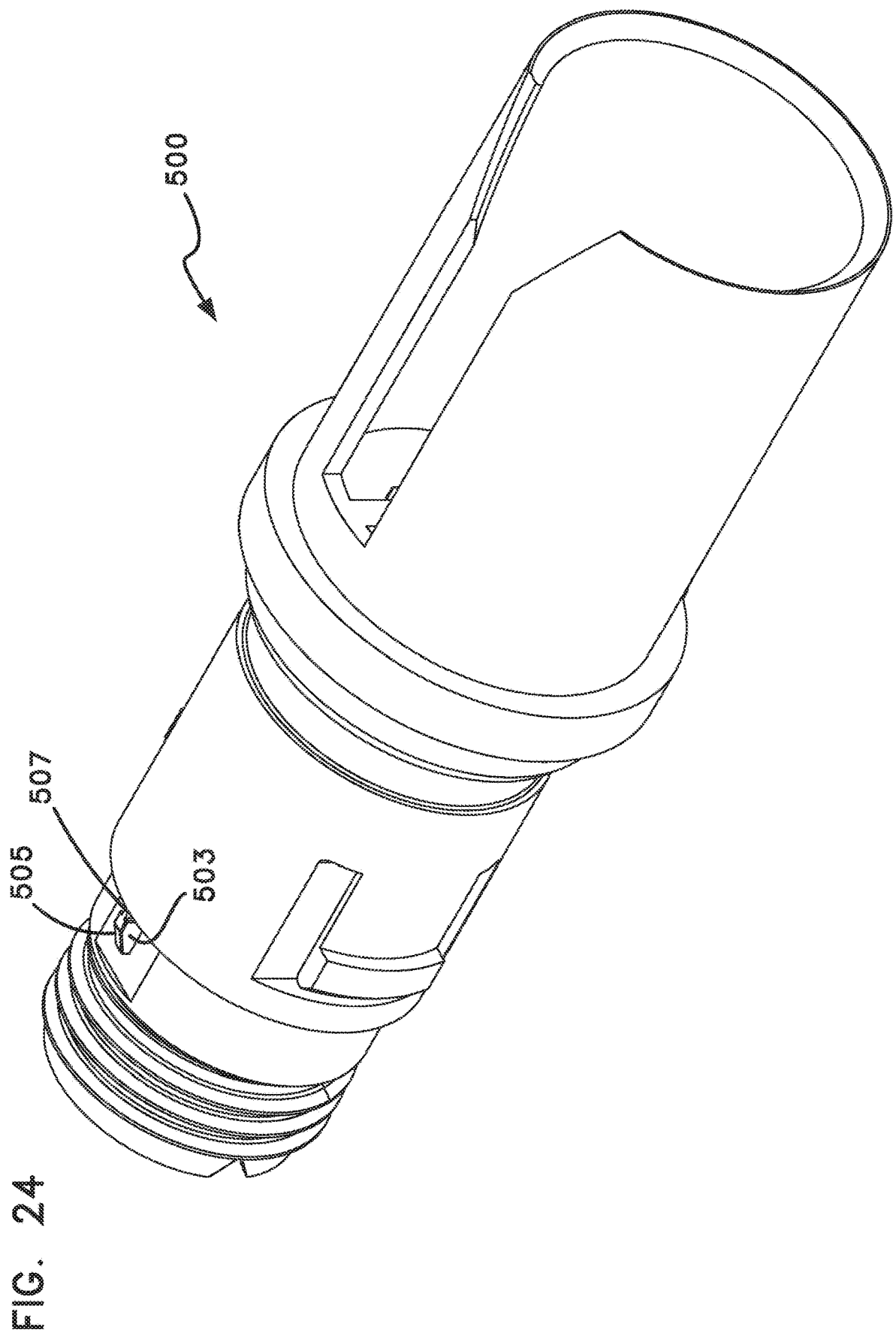
FIG. 24 is a perspective view of an alternative version of a shroud in accordance with the principles of the present disclosure that includes breakable rotational locking mechanical interface features.
Figure 25:
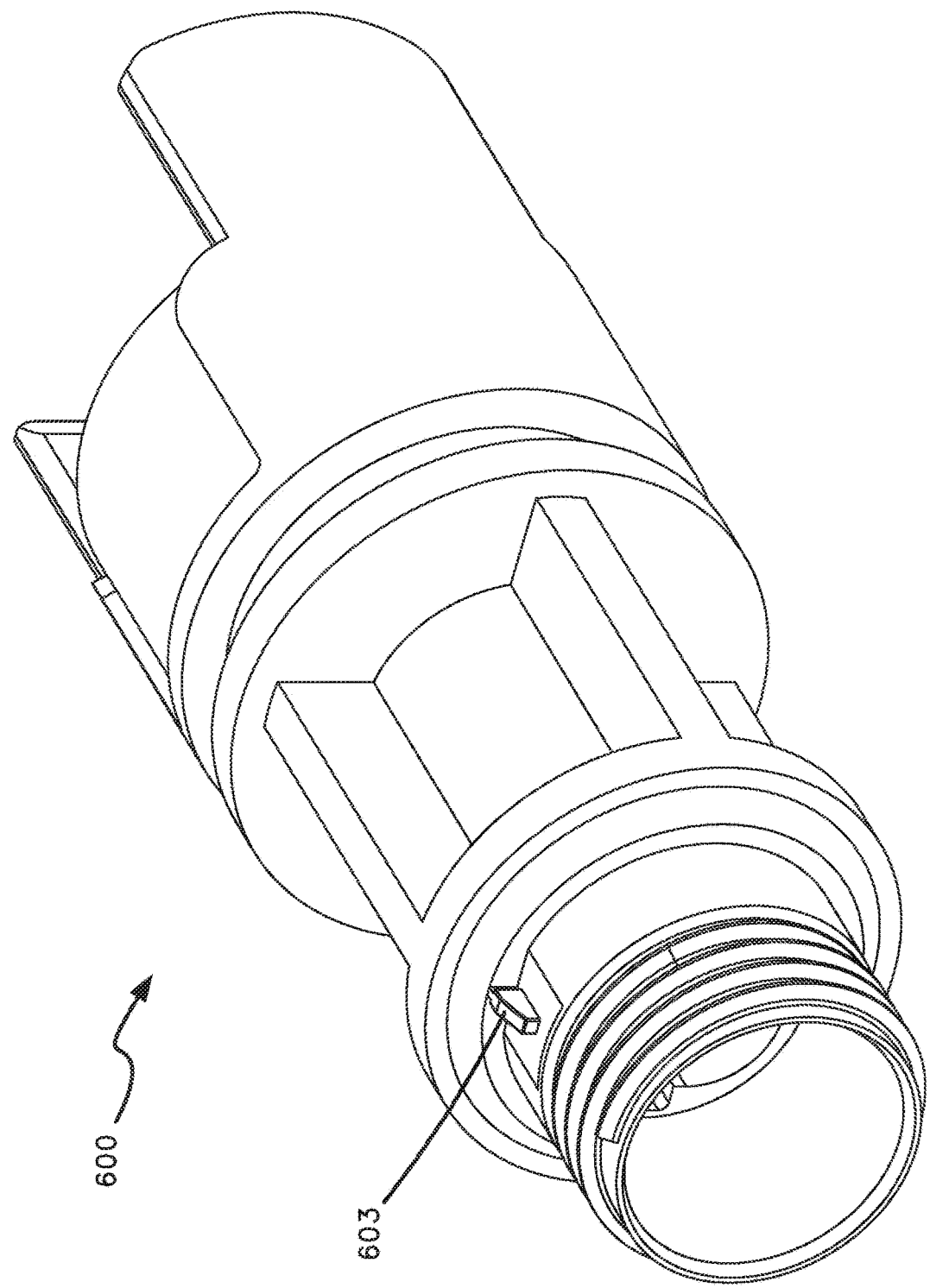
FIG. 25 illustrates yet another version of a shroud in accordance with the principles of the present disclosure that includes breakable rotational locking mechanical interface features similar to those of the shroud of FIG. 24.

In other examples, the rotation locking mechanical interfaces interlock in such a way that unintentional disengagement of the rotation mechanical interfaces is prevented or limited, but the shroud and the shroud retainer can be decoupled from one another intentionally by manually unlatching the two components. In yet other examples, the rotation locking mechanical interfaces interlock in such a way that unintentional disengagement of the rotation mechanical interfaces is prevented or limited, but that if sufficient torque, force, or another type of a manual unlatching step is applied between the shroud and the shroud retainer, the shroud and the shroud retainer can be decoupled from one another intentionally. According to certain examples, the shroud and the shroud retainer can be intentionally designed where decoupling the shroud from the shroud retainer, with sufficient torque, causes breaking of the rotation locking mechanical interface of the shroud. In this manner, the connector core 23 and the shroud retainer 26 of a given connector assembly system 20 can still remain intact and can be re-used with a different or a different format shroud if desired, while the broken shroud is discarded. Examples of such shroud designs are illustrated in FIGS. 24 and 25 and discussed in further detail below.

Figure 16:
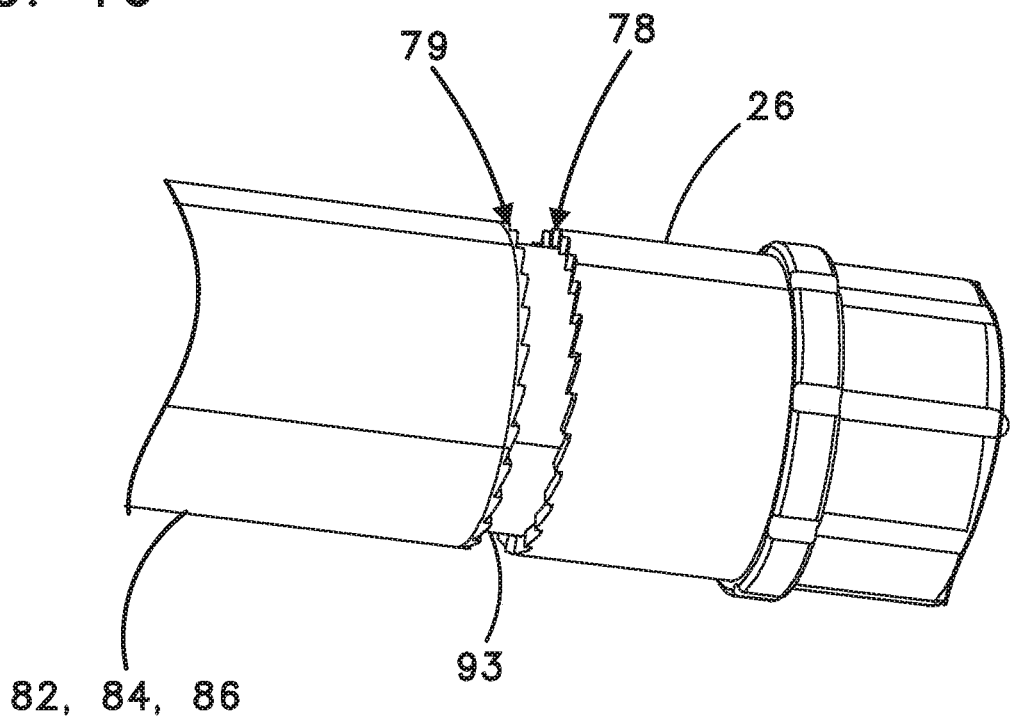
FIG. 16 is a perspective view showing an example configuration for the shroud retainer that mounts on the connector core of FIG. 1.
Figure 17:
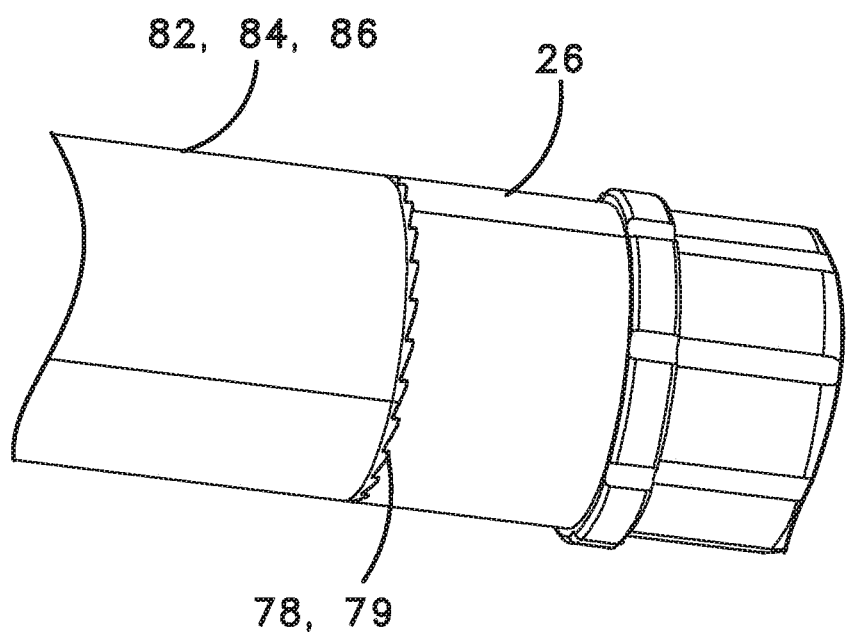
FIG. 17 is a perspective view showing the shroud retainer of FIG. 16 coupled to a rear end of an example shroud in accordance with the principles of the present disclosure.
Figure 20:
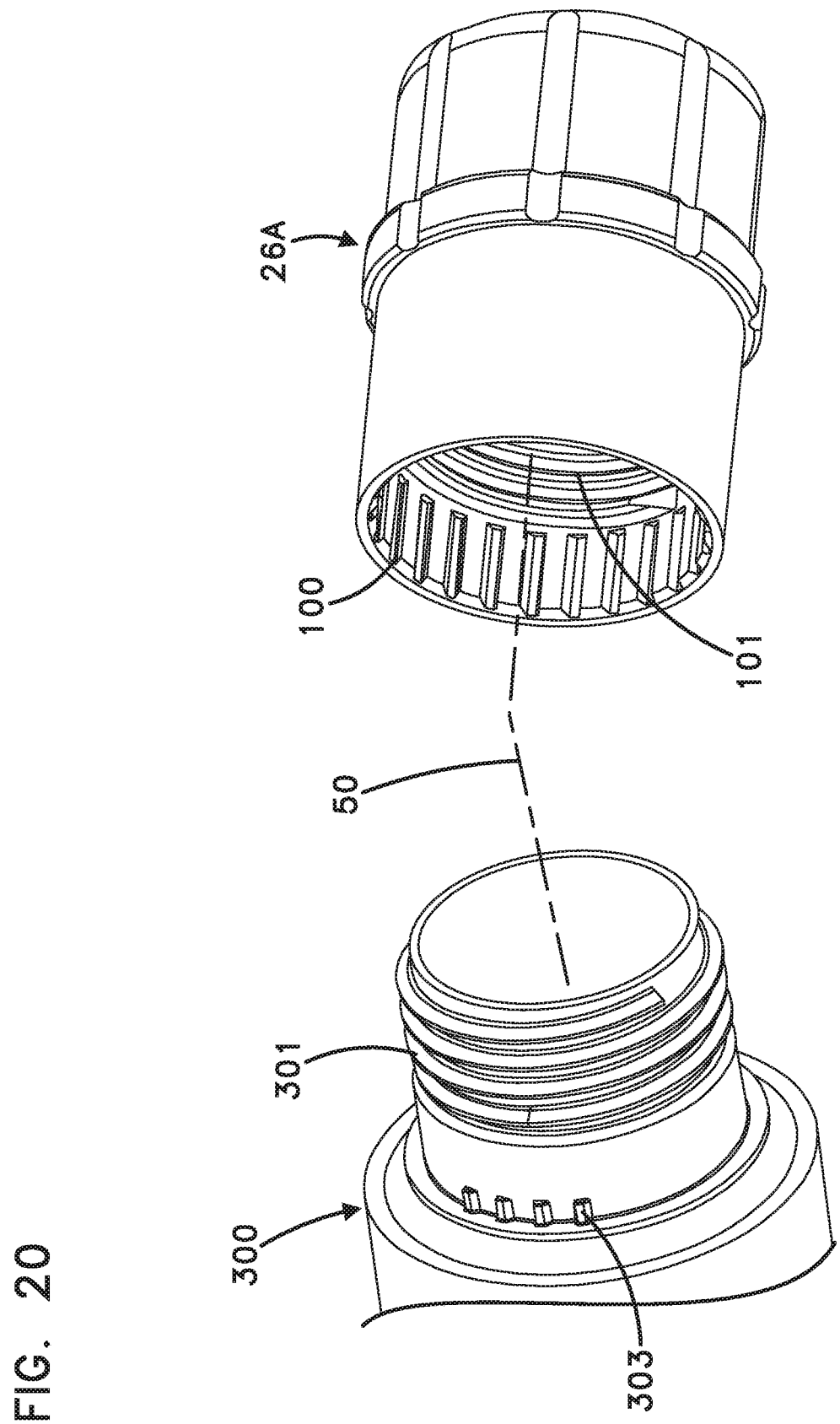
FIG. 20 shows an alternative mechanical interface configuration in accordance with the principles of the present disclosure that is defined between an example shroud retainer in accordance with the principles of the present disclosure and a rear end of a shroud in accordance with the principles of the present disclosure.

As depicted at FIGS. 5, 16, and 17, one example type of rotation locking mechanical interface configuration can include a first rotation locking mechanical interface 78 such as plurality of teeth such as ratchet teeth 91 provided at the front axial end face of the shroud retainer 26 and a second rotation locking mechanical interface 79 including ratchet teeth 93 provided at a rear axial end face of each of the shrouds 82, 84, and 86. The ratchet teeth 91, 93 can be positioned circumferentially about the longitudinal axis 50 and can be configured to interlock in a snap-fit manner when the shroud retainer 26 fully engages with its corresponding selected shroud 82, 84 or 86. FIG. 20 shows an alternative rotation locking configuration where an alternative shroud retainer 26a is provided with a plurality of locking ribs 100 positioned in the interior of the shroud retainer 26. The locking ribs 100 extend longitudinally and are spaced circumferentially from one another about the longitudinal axis 50. The shroud retainer 26a can include an interior rotational mechanical interface such as threads 101 or a bayonet interface adapted to couple with a corresponding rotational mechanical interface provided at the rear end of a shroud 300 desired to be coupled with the shroud retainer 26a. As depicted, the alternative shroud 300 includes a rotational mechanical interface 301 in the form of exterior threads. The shroud 300 also includes a plurality of bumps, ribs or projections 303 adapted to interlock in a snap-fit manner with the ribs 100 within the interior of the shroud retainer 26a to prevent the shroud retainer 26a and the shroud 300 from being unintentionally decoupled from one another after coupling has taken place. The ribs 100 and projections 303 provide a rotation locking mechanical interface configuration.

Figure 21:
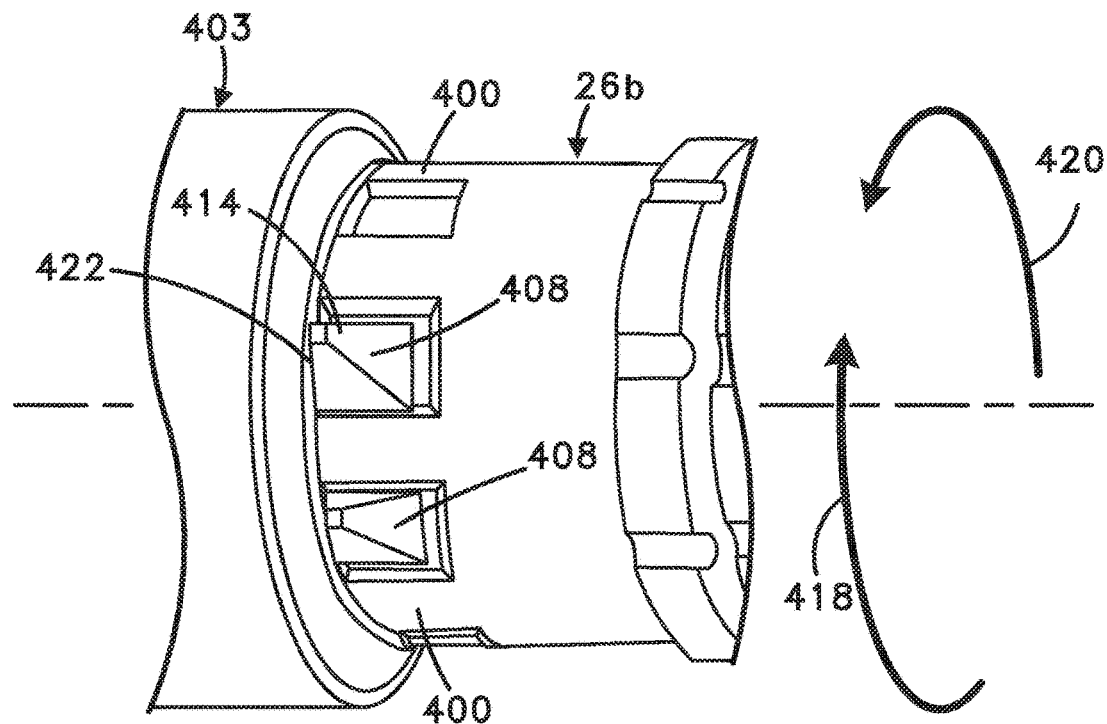
FIG. 21 shows a further alternative mechanical interface configuration in accordance with the principles of the present disclosure that is defined between an example shroud retainer in accordance with the principles of the present disclosure and a rear end of a shroud in accordance with the principles of the present disclosure.
Figure 22:
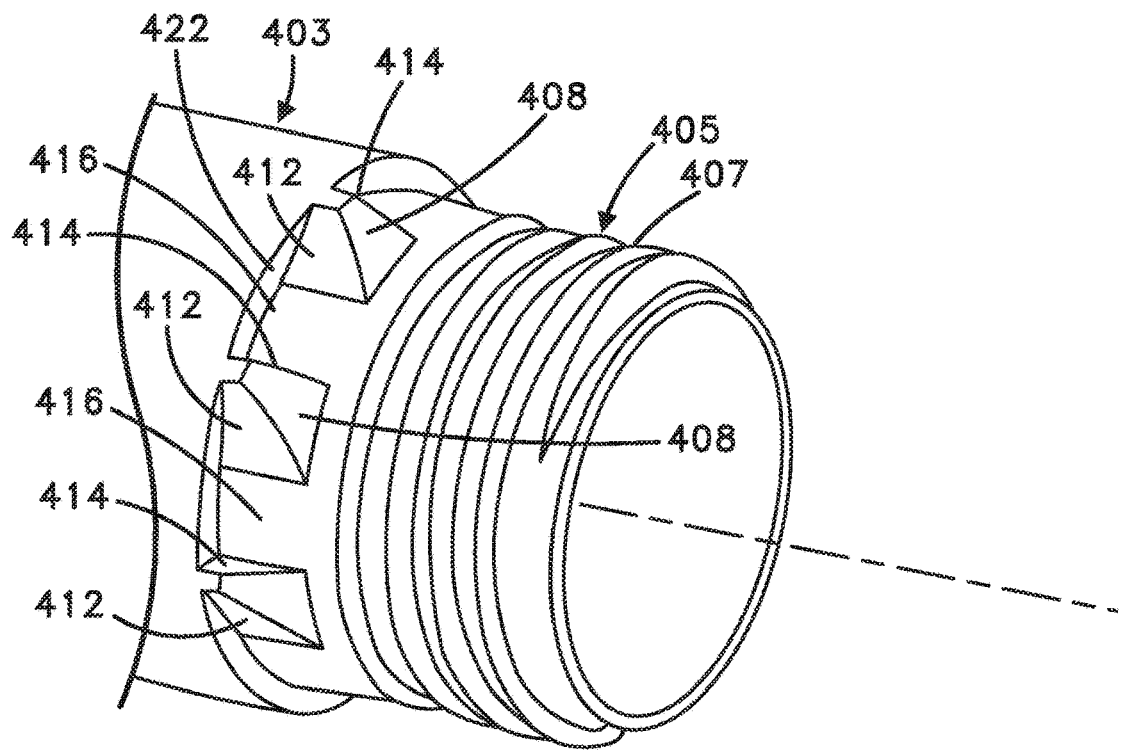
FIG. 22 is a perspective view of the shroud of the mechanical interface configuration of FIG. 21.

FIG. 21 shows an alternative rotation locking configuration where an alternative shroud retainer 26b is provided with a plurality of locking fingers 400 positioned at a front end of the shroud retainer 26b. The locking fingers 400 extend longitudinally and are spaced circumferentially from one another about a longitudinal axis 401. The shroud retainer 26b can include an interior rotational mechanical interface such as threads or a bayonet interface adapted to couple with a corresponding rotational mechanical interface provided at the rear end of a shroud 403 desired to be coupled with the shroud retainer 26b. As depicted at FIG. 22, the alternative shroud 403 includes a rotational mechanical interface 405 in the form of exterior threads 407 (or alternatively a bayonet type interface). The shroud 403 also includes a plurality of projections 408 adapted to interlock in a snap-fit manner between the fingers 400 to prevent the shroud retainer 26b and the shroud 403 from being unintentionally decoupled from one another after coupling has taken place. The fingers 400 and projections 408 provide a rotation locking mechanical interface configuration.

Figure 23:
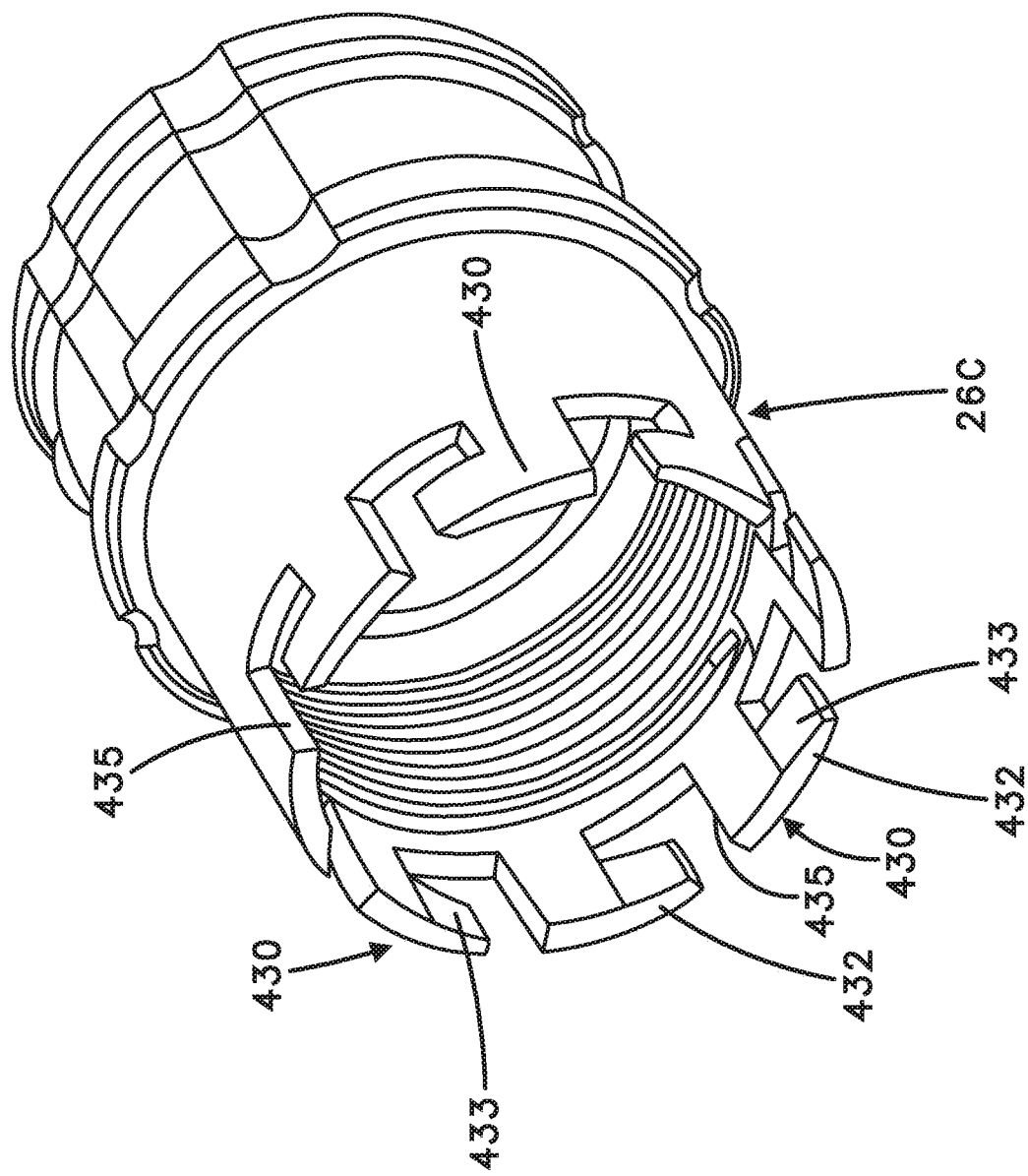
FIG. 23 depicts another shroud retainer in accordance with the principles of the present disclosure.

The projections 408 are spaced circumferentially about an exterior of the shroud 403 at a location in front of the exterior threads 407. The projections each include a ramp surface 412 and a stop surface 414 that face in opposite circumferential directions. The stop surfaces 414 are oriented at a steeper angle as compared to the ramp surfaces 412. In one example, the stop surfaces 414 are perpendicular relative to the outer circumferential surface of the shroud 403. Gaps 416 are provided circumferentially between the projections 408. When the shroud retainer 26b is threaded onto the shroud 403 (e.g., rotated relative to the shroud 403 in a threading direction 418), the locking fingers 400 ride and flex over the ramp surfaces 412 and snap into the gaps 416. Once the locking fingers 400 snap into the gaps 416, interference between the locking fingers 400 and the stop surfaces 414 prevent rotation of the shroud retainer 26b relative to the shroud 403 in an unthreading direction 420. The shroud retainer 26b can be threaded in the shroud 403 until outer tips of the locking fingers 400 abut against a shoulder 422 at an exterior of the shroud 403. The stop surfaces 414 and the ramp surfaces 412 are configured such that it is more difficult to rotate the shroud retainer 26b in the unthreading direction 420 as compared to the threading direction 418. Preferably, when the locking fingers 400 fit within the gaps 416, interference between the sides of the locking fingers 400 and the stop surfaces 414 prevents the shroud retainer 26b from being unthreaded or otherwise rotationally disengaged from the shroud 403. FIG. 23 shows another shroud retainer 26c that is compatible with the shroud 403. The shroud retainer 26c has the same configuration as the shroud retainer 26b except the shroud retainer 26c has locking fingers 430 that are L-shaped rather than straight. Outer legs 432 of the L-shaped fingers 430 snap between the projections 408 into the gaps 416 when the shroud retainer 26c is threaded onto the shroud 403. The outer legs 432 define inner ramps 433 that facilitate flexing the fingers 430 over the projections 408. Stop surfaces 435 on the fingers 430 oppose the stop surfaces 414 to prevent unthreading of the shroud retainer 26c from the shroud 403 once the shroud retainer 26c has been threaded on the shroud 403. In an alternative example, the threaded interface can be replaced with an alternative rotational coupling interface such as a bayonet interface.

As noted above, a given shroud and the shroud retainer can be intentionally designed where decoupling the shroud from the shroud retainer causes breaking of the rotation locking mechanical interface of the shroud. In this manner, the connector core 23 and the shroud retainer 26 of a given connector assembly system 20 can still remain intact and can be re-used with a different shroud if desired. One example of such a shroud 500 that defines a breakable rotation locking interface is illustrated in FIG. 24. As depicted, the shroud 500 includes only a single bump, rib, or projection 503 on opposing sides of the shroud 500 that are adapted to rotationally interlock in a snap-fit manner with, for example, the internal locking features of a shroud retainer such as the shroud retainer 26a, 26b, or 26c shown in FIGS. 20-23. Providing only a single projection 503 on each opposing side of the shroud 500, as compared to multiple projections such as those shown for shrouds 300 and 403 of FIGS. 20 and 22, facilitates breaking of the rotation locking interface of the shroud 500, while preserving the connector core and the shroud retainer. The shape of the projection 503 is depicted in FIG. 24 as defining a thin ridge 505, with a recessed bottom surface 507 to facilitate breaking for intentional removal of the shroud 500. The shroud is similar in form to the shroud 82 illustrated in FIGS. 7-9, except for the intentionally breakable features 503. FIG. 25 illustrates another example of a shroud 600 with intentionally breakable projections 603. The shroud 600 shares similar inventive features as those discussed for shroud 500 of FIG. 24. And, shroud 600 is similar in form to the shroud 84 illustrated in FIGS. 10-12, except for the intentionally breakable features 603.

Figure 18:
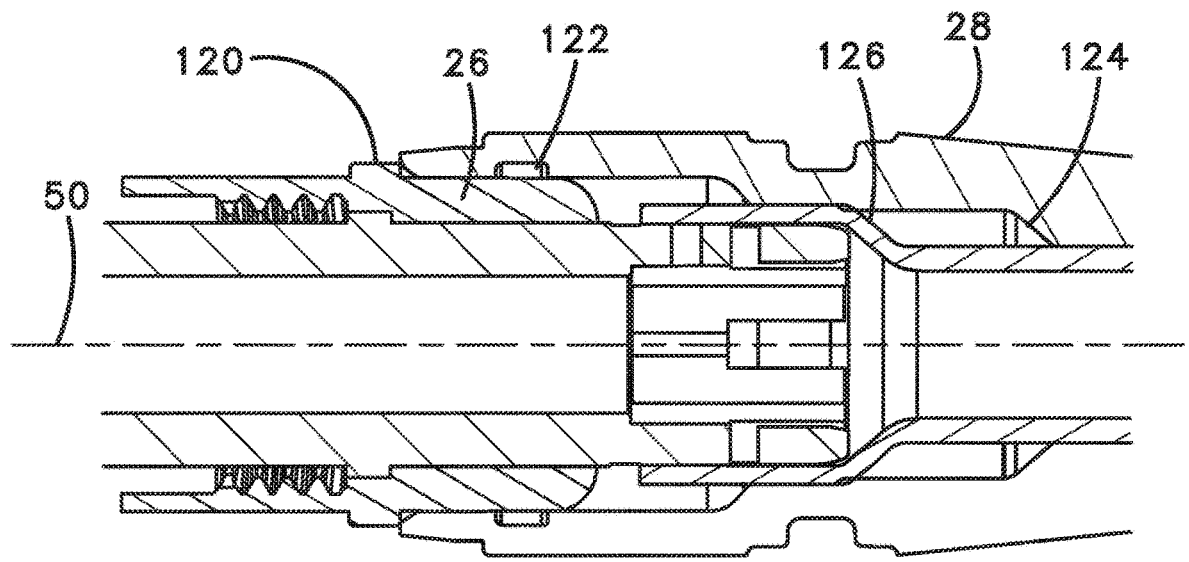
FIG. 18 is a cross-sectional view showing a boot mounted in a first axial position upon the shroud retainer that mounts on the connector core of FIG. 1.
Figure 19:
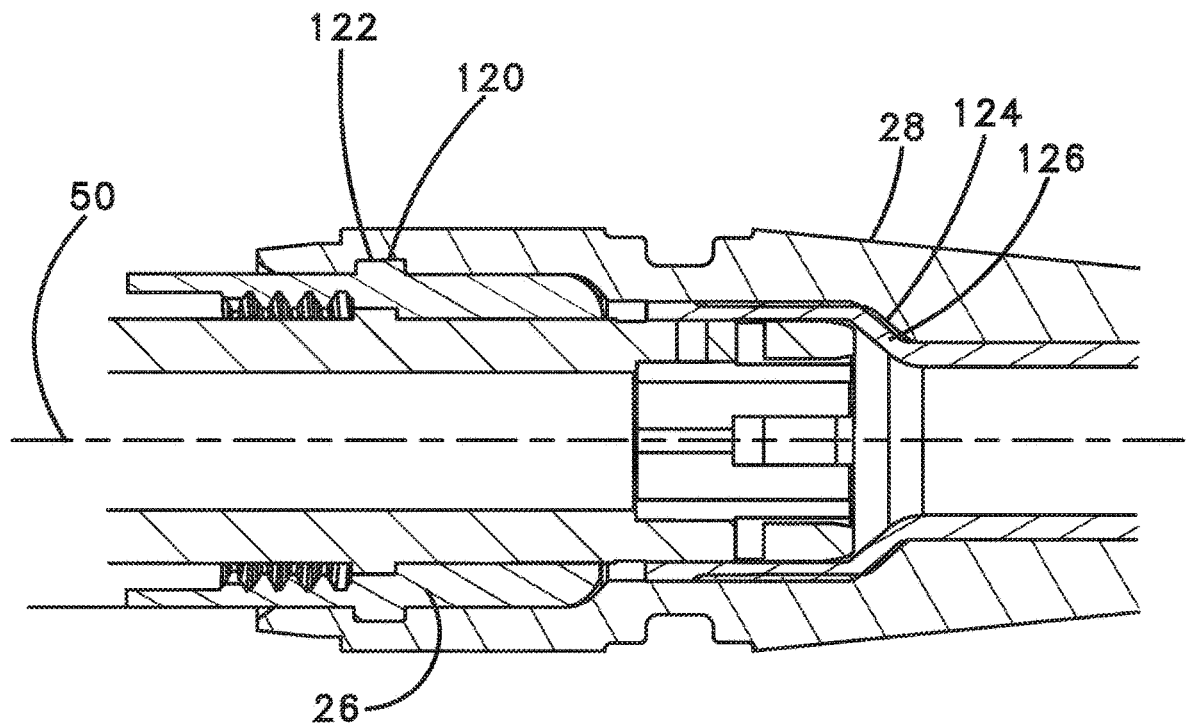
FIG. 19 shows the boot of FIG. 18 in a second axial position relative to the shroud retainer.

Referring now to FIGS. 18 and 19, the boot 28 is configured to mount over a rear end of the shroud retainer 26. The boot 28 is mountable on the shroud retainer 26 in a first position (see FIG. 18) in which the boot 28 frictionally engages the shroud retainer 26 but does not engage the shroud retainer 26 by a snap-fit connection or other type of interlock. Thus, when the boot 28 is in the first position, it is possible to pull the boot 28 rearwardly off of the shroud retainer 26 if needed to provide enhanced access to the shroud retainer 26 or to provide enhanced clearance for passing another component (e.g., an outer fastening component) rearwardly over the shroud retainer 26. The boot 28 is movable from the first position in a forward direction to a second position as shown at FIG. 19. In the second position of FIG. 19, the boot 28 interlocks with the shroud retainer 26. In certain examples, the interlock can be provided by a snap-fit connection. As depicted at FIG. 19, the interlock is provided by an outer shoulder 120 of the shroud retainer 26 that snaps within a corresponding receptacle 122 defined within the interior of the boot 28.

It will be appreciated that the interior of the boot 28 includes an inner tapered section 124 that has a taper that generally matches a corresponding outer taper 126 defined by the shape memory sleeve and the rear end of the connector core body 24. When the boot 28 is in the first position of FIG. 18, the inner taper 124 of the boot is rearwardly axially offset from the taper 126 of the shape memory sleeve. In this configuration, tapers 124, 126 are axially spaced from one another and do not engage one another. Thus, a relatively low level of friction exists between the boot 28 and the shape memory sleeve, the cable and/or the connector core body 24. Thus, the boot 28 can readily be rotated relative to the fiber optic cable 22 about the longitudinal axis 50.

By grasping the front end of the boot 28 and pressing against the rear end of the shroud retainer 26, it is possible to grip the shroud retainer 26 through the boot 28 and use the boot to turn the shroud retainer 26 as the shroud retainer 26 is coupled to a component desired to be mounted over the connector core body 24. When the boot 28 is moved to the forward, second position, the tapered profile 124 of the interior of the boot 28 engages the tapered profile 126 defined by the shape memory sleeve such that the profiles are pressed together thereby greatly increasing the friction that exists between the boot 28 and the shape memory sleeve. In this way, when the boot 28 is in the forward position, the boot 28 is much more difficult to turn relative to the fiber optic cable 22. In this way, the boot assists in preventing the shroud retainer 26 from decoupling from its corresponding mated component that is mounted over the connector core body 24.

Figure 7:
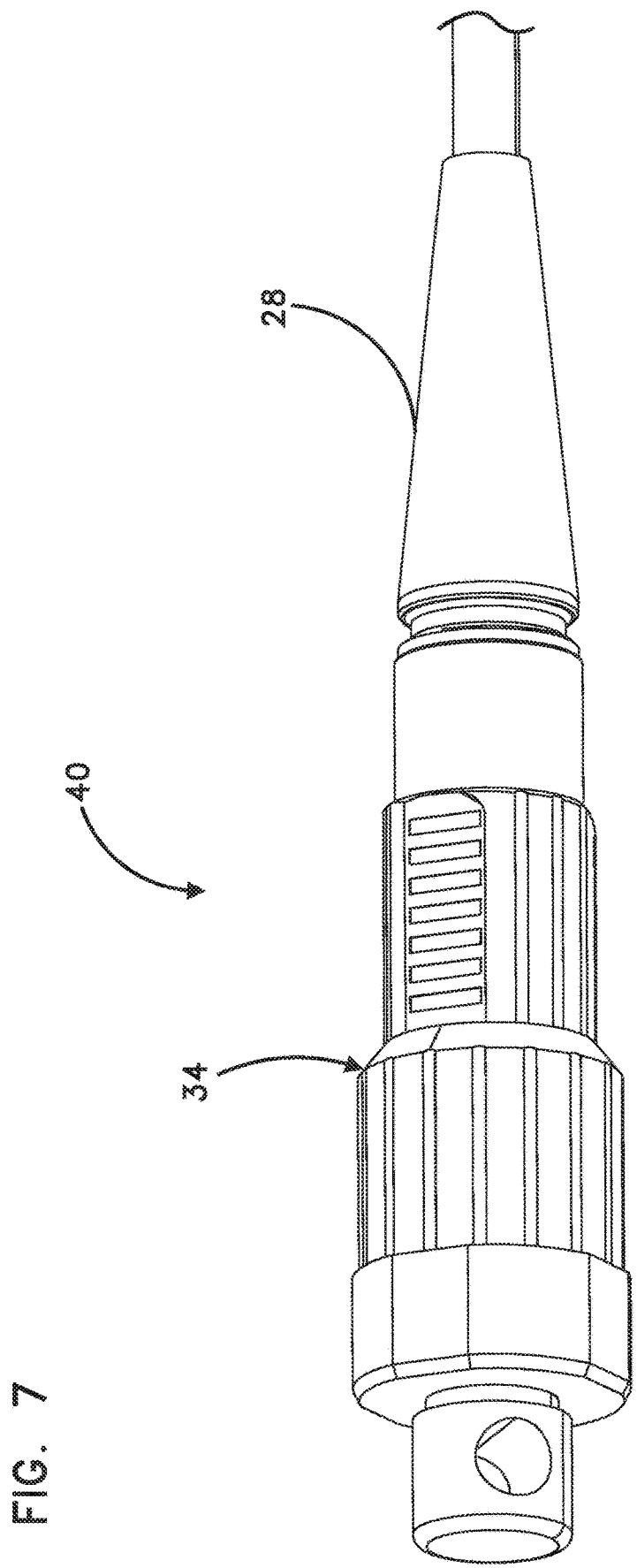
FIG. 7 illustrates a first fiber optic connector assembly including the connector core of FIG. 1 shown with a first hardened connector shroud and fastener arrangement mounted thereto.
Figure 8:
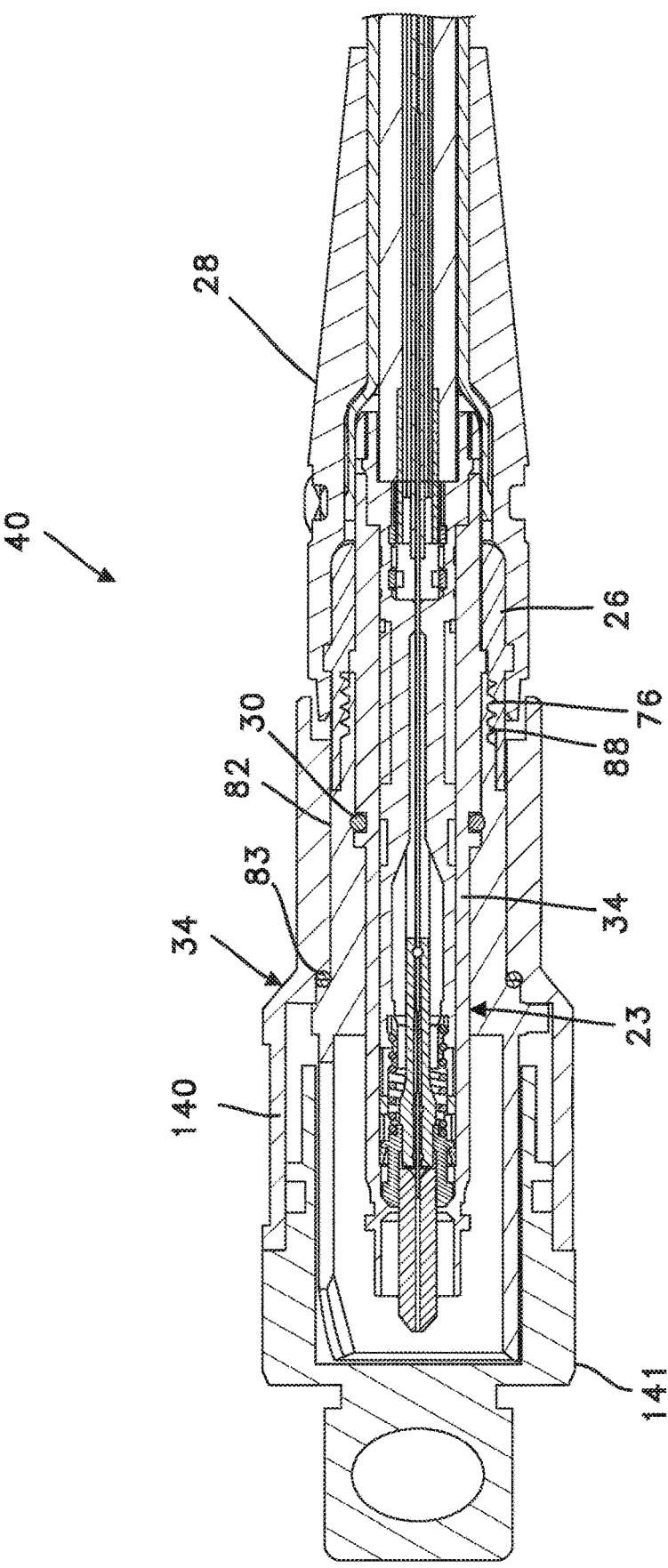
FIG. 8 is a cross-sectional view taken longitudinally through the first fiber optic connector assembly of FIG. 7.
Figure 9:
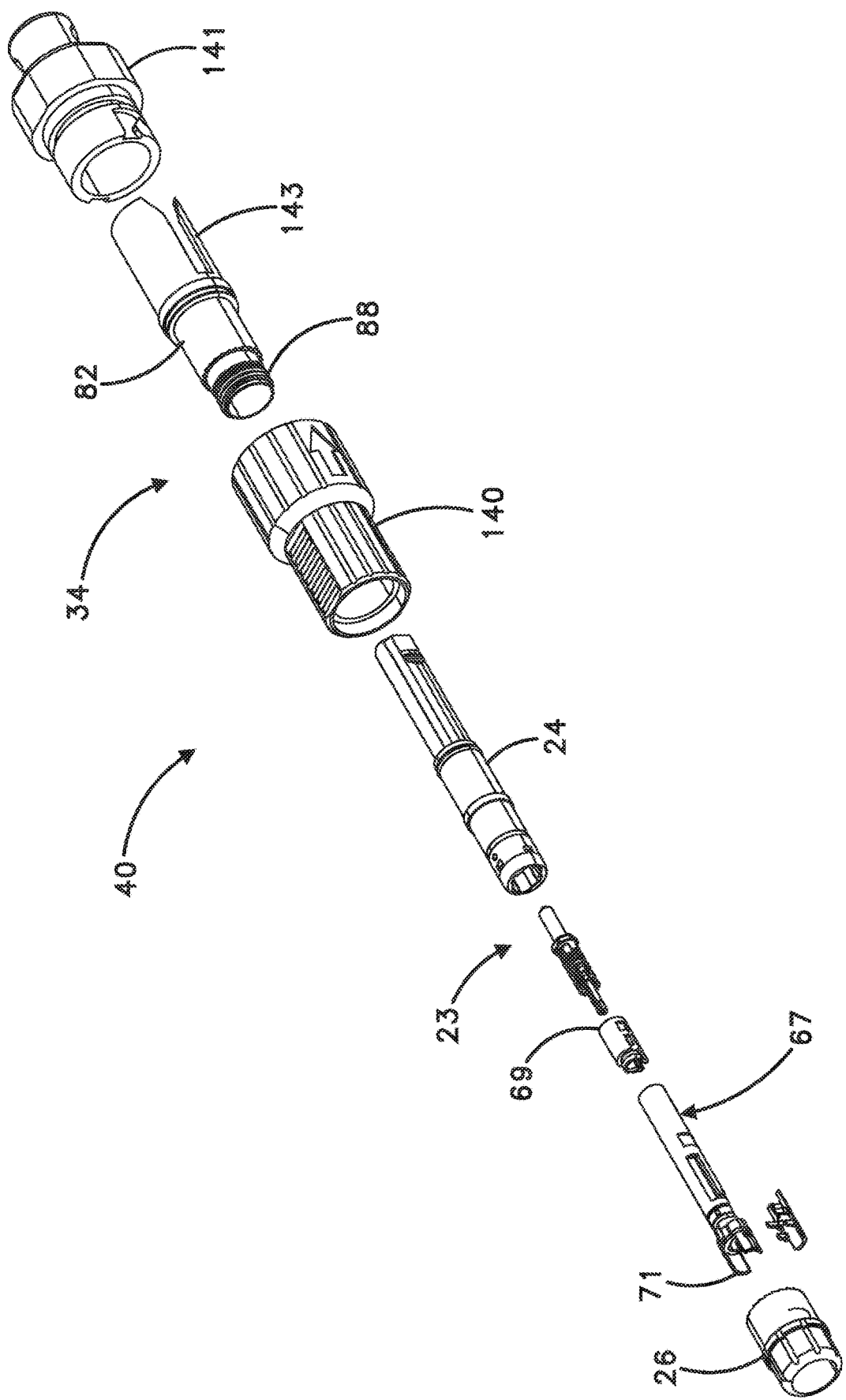
FIG. 9 is an exploded view of the first fiber optic connector assembly of FIGS. 7 and 8.

Referring to FIGS. 7-9, the first hardened connector shroud and fastener arrangement 34 is shown mounted on the connector core 23. The arrangement 34 includes the shroud 82 that mounts over the core 23 and a fastening member 140 that rotationally mounts over the shroud 82. Seal 83 is a resilient structure that compresses between the fastening member 140 and the outside of the shroud 82. The seal 30 seals between the outside of the core 23 and the inside of the shroud 82. The fastening member 140 is depicted as an outer housing having a bayonet-type interface (e.g., bayonet pins) adapted to engage with bayonet slots of a corresponding fiber optic adapter when the fiber optic connector assembly 40 is coupled to the fiber optic adapter. The fastening member 140 can also be secured to a removable dust cap 141. The shroud 82 includes a keying structure in the form of a slot 143 that mates with a corresponding projection in the fiber optic adapter when the fiber optic connector assembly 40 is mated with the fiber optic adapter. In this way, the keying structure ensures that the fiber optic connector assembly 40 is inserted into the fiber optic adapter at a desired rotational orientation. As depicted at FIGS. 7 and 8, the fastening member 140 is shown coupled to the dust cap 141 for protecting the connector core body 23 prior to the time the fiber optic connector assembly 40 is coupled to the corresponding fiber optic adapter. When it is desired to couple the fiber optic connector assembly 40 to the fiber optic adapter, the dust cap 141 can be removed thereby allowing the fiber optic connector assembly 40 to be coupled to the fiber optic adapter. A lanyard can be used to couple the dust cap to the fiber optic connector assembly 40.

Figure 10:
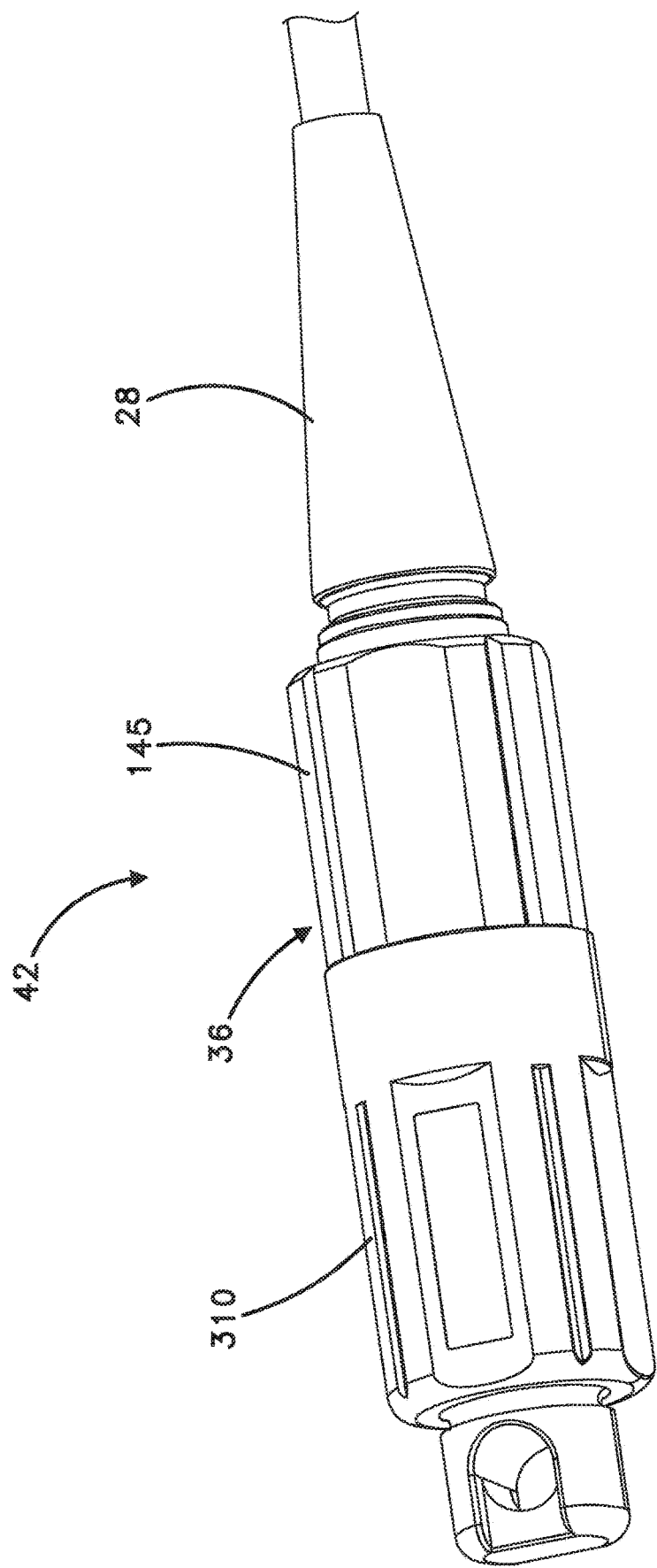
FIG. 10 depicts a second fiber optic connector assembly including the connector core of FIG. 1 shown coupled to a second hardened connector shroud and fastener assembly.
Figure 11:
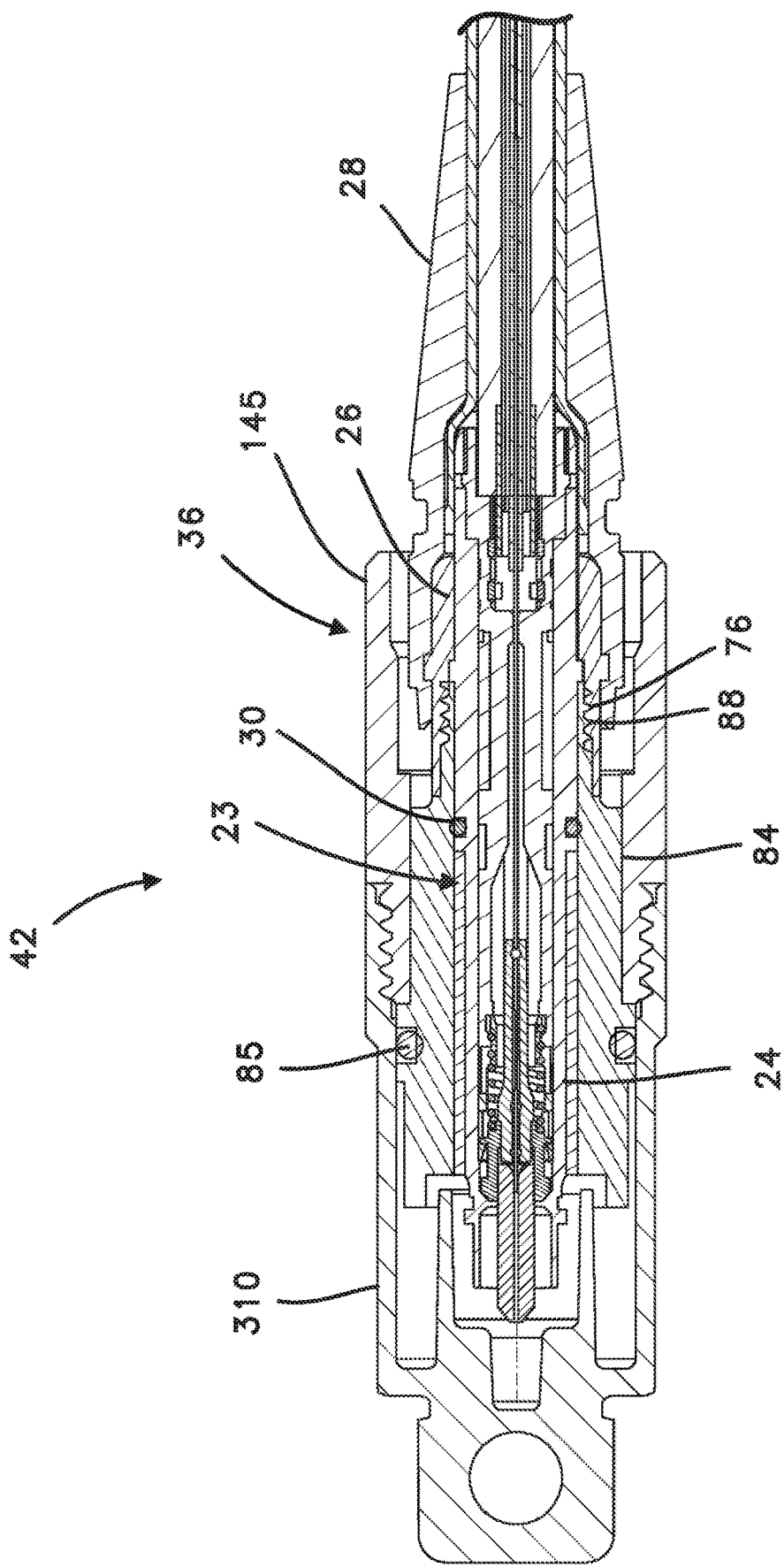
FIG. 11 is a cross-sectional view taken longitudinally through the second fiber optic connector assembly of FIG. 10.
Figure 12:
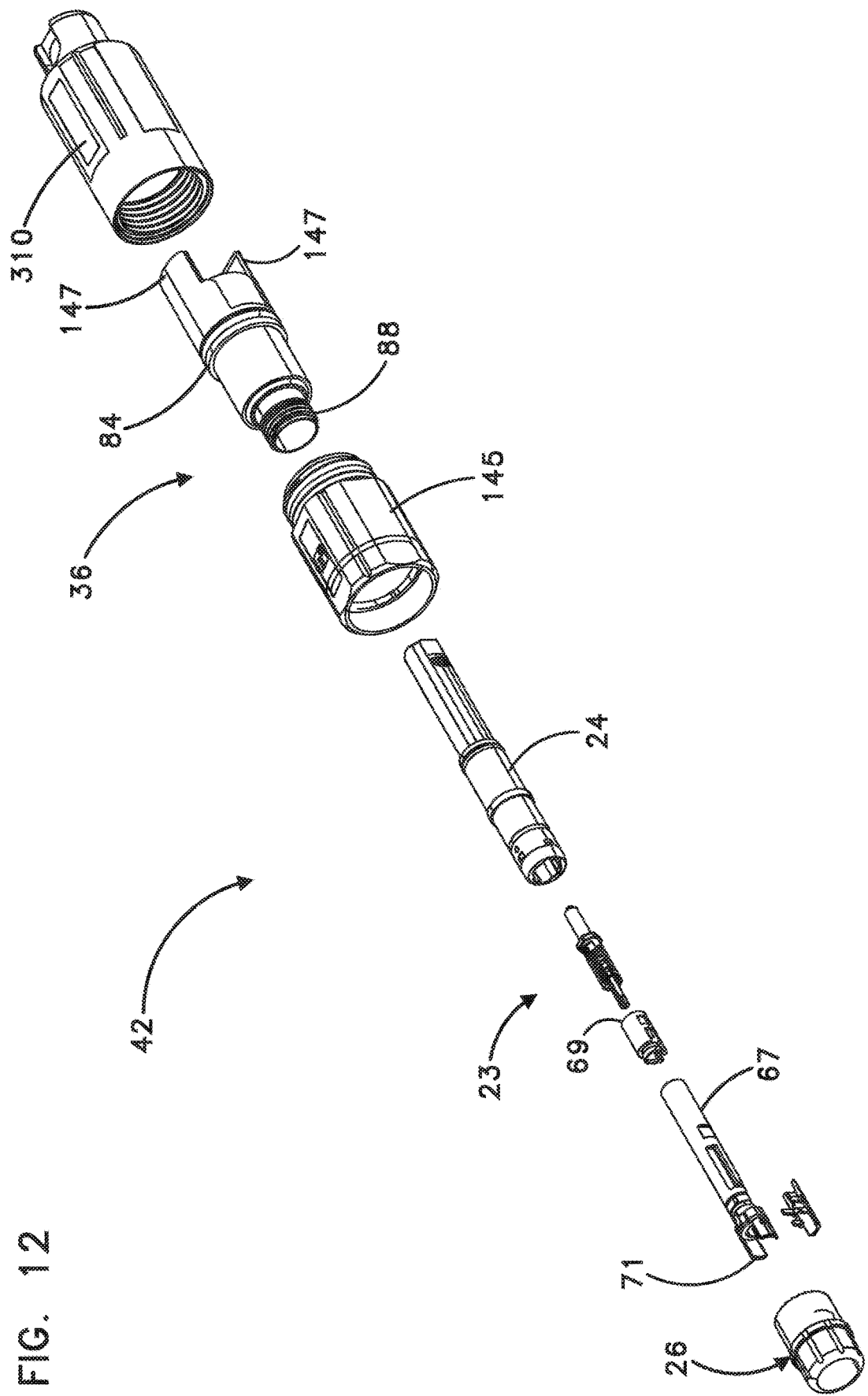
FIG. 12 is an exploded view of the second fiber optic connector assembly of FIGS. 10 and 11.

FIGS. 10-12 depict the second fiber optic connector assembly 42 which is formed when the second hardened connector shroud and fastener arrangement 36 is mounted over the connector core body 24. The second hardened connector shroud and fastener arrangement 36 includes the shroud 84 and an outer fastening member 145 depicted as a coupling nut having external threads. The seal 30 seals against the inside of the shroud 84. The shroud 84 includes a pair of front paddles 147 adapted to provide a keying function for rotationally aligning the fiber optic connector assembly 42 within a corresponding fiber optic adapter. The exterior threads of the outer fastening member 145 are adapted to engage with corresponding interior threads of the fiber optic adapter to secure the fiber optic connector assembly 42 within the fiber optic adapter. As depicted at FIGS. 10 and 11, the fastening member 145 is shown coupled to a dust cap 310 that is used to protect the connector core 23 until it is desired to couple the second fiber optic connector assembly 42 to the corresponding fiber optic adapter. When it is time to couple the fiber optic connector assembly 42 to the corresponding fiber optic adapter, the fastening member 145 is unthreaded from the dust cap 310 thereby providing full access to the connector core body 24 and thereby allowing the fiber optic connector assembly 42 to be readily inserted into the port of the corresponding fiber optic adapter and secured thereto via the fastening member 145. Seal 85 carried by the shroud 84 is adopted to seal against the dust cap 147 or the fiber optic adapter.

In consideration of the embodiment of FIGS. 10 and 11, it will be appreciated that the length of the fastening member 145 blocks access to the shroud retainer 26. Thus, to couple the shroud retainer 26 to the shroud 84, it may be required to slide the boot 28 rearwardly from the shroud retainer 26 and to slide the fastening member 145 rearwardly past the shroud retainer 26. Thereafter, the shroud retainer 26 can be readily accessed to couple the shroud retainer to the shroud 84 by the turn-to-engage configuration. The fastening nut can then be slid back over the shroud 84 and the boot 28 can be snapped over the shroud retainer 26.

Figure 13:
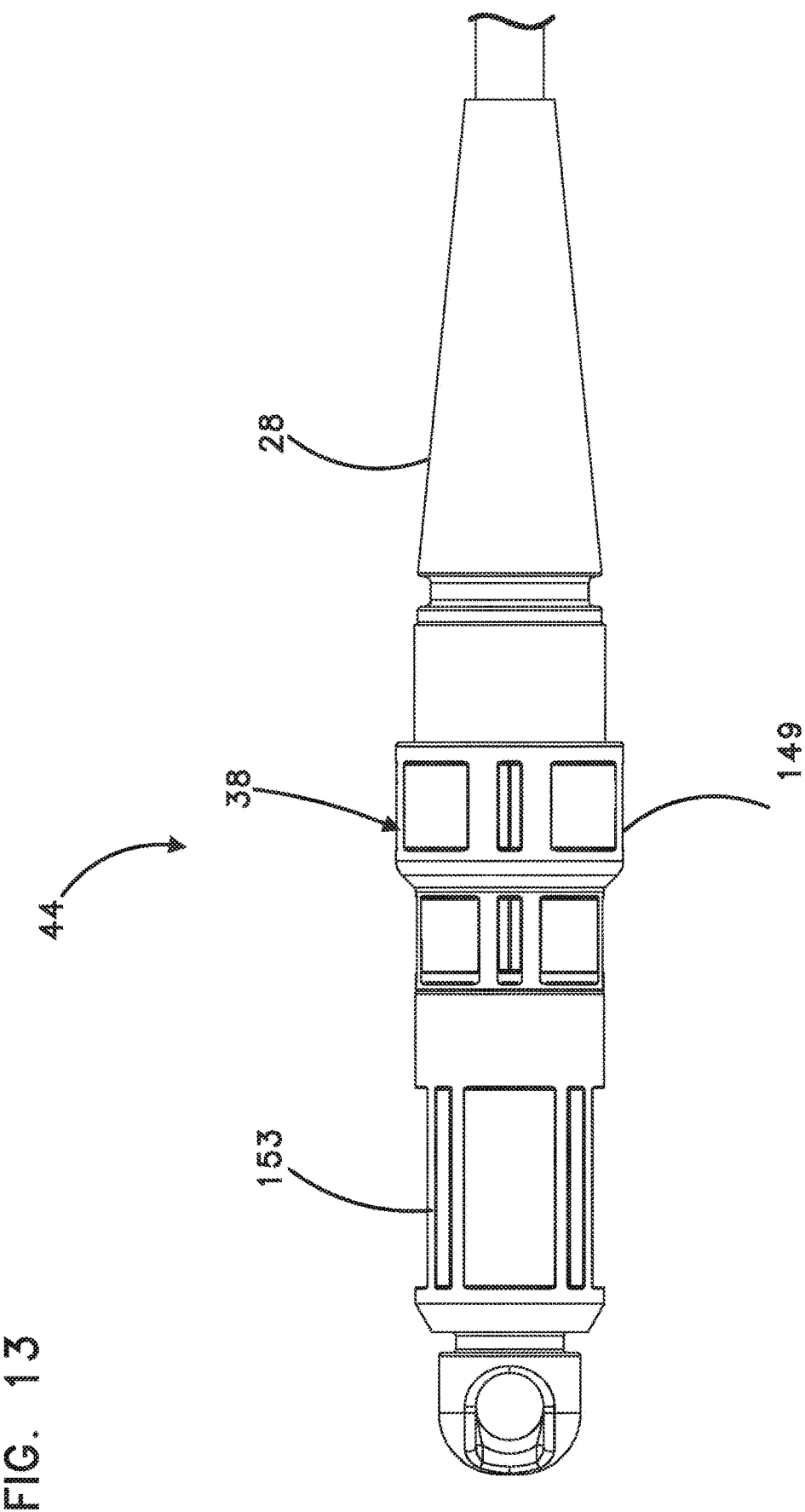
FIG. 13 depicts a third fiber optic connector assembly including the connector core of FIG. 1 shown coupled to a third hardened connector shroud and fastener arrangement.
Figure 14:
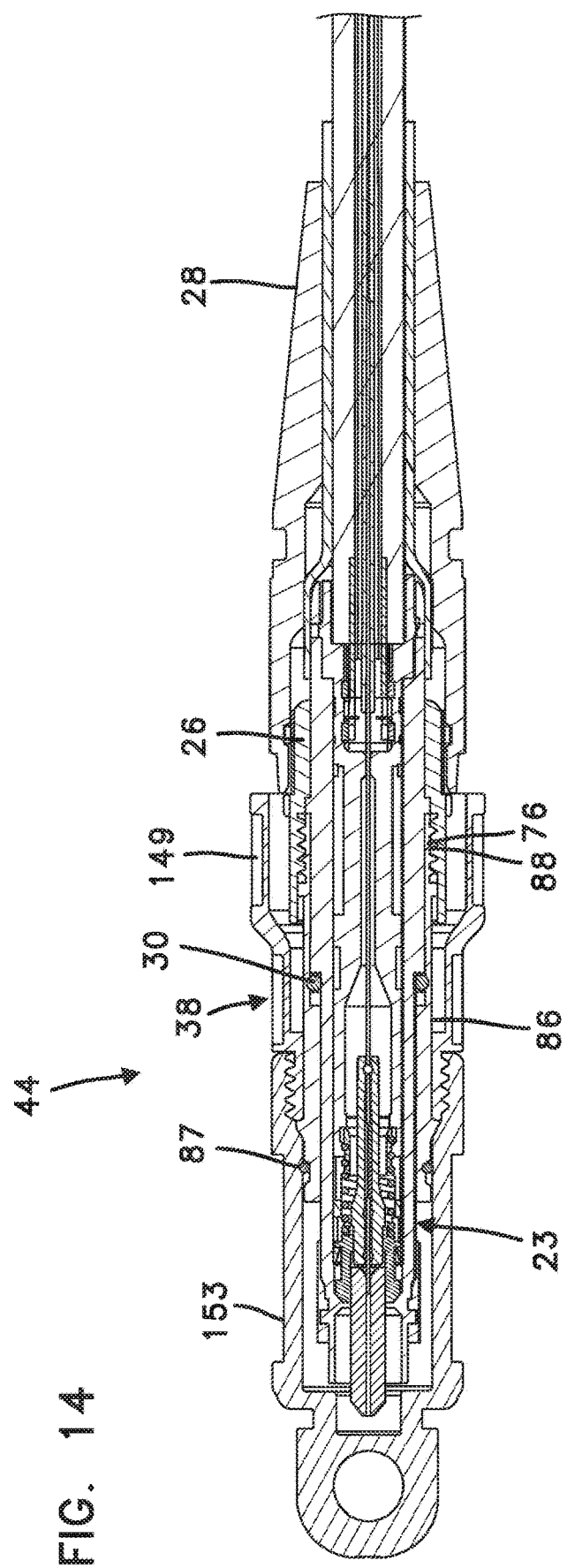
FIG. 14 is a cross-sectional view taken longitudinally through the third fiber optic connector assembly of FIG. 13.
Figure 15:
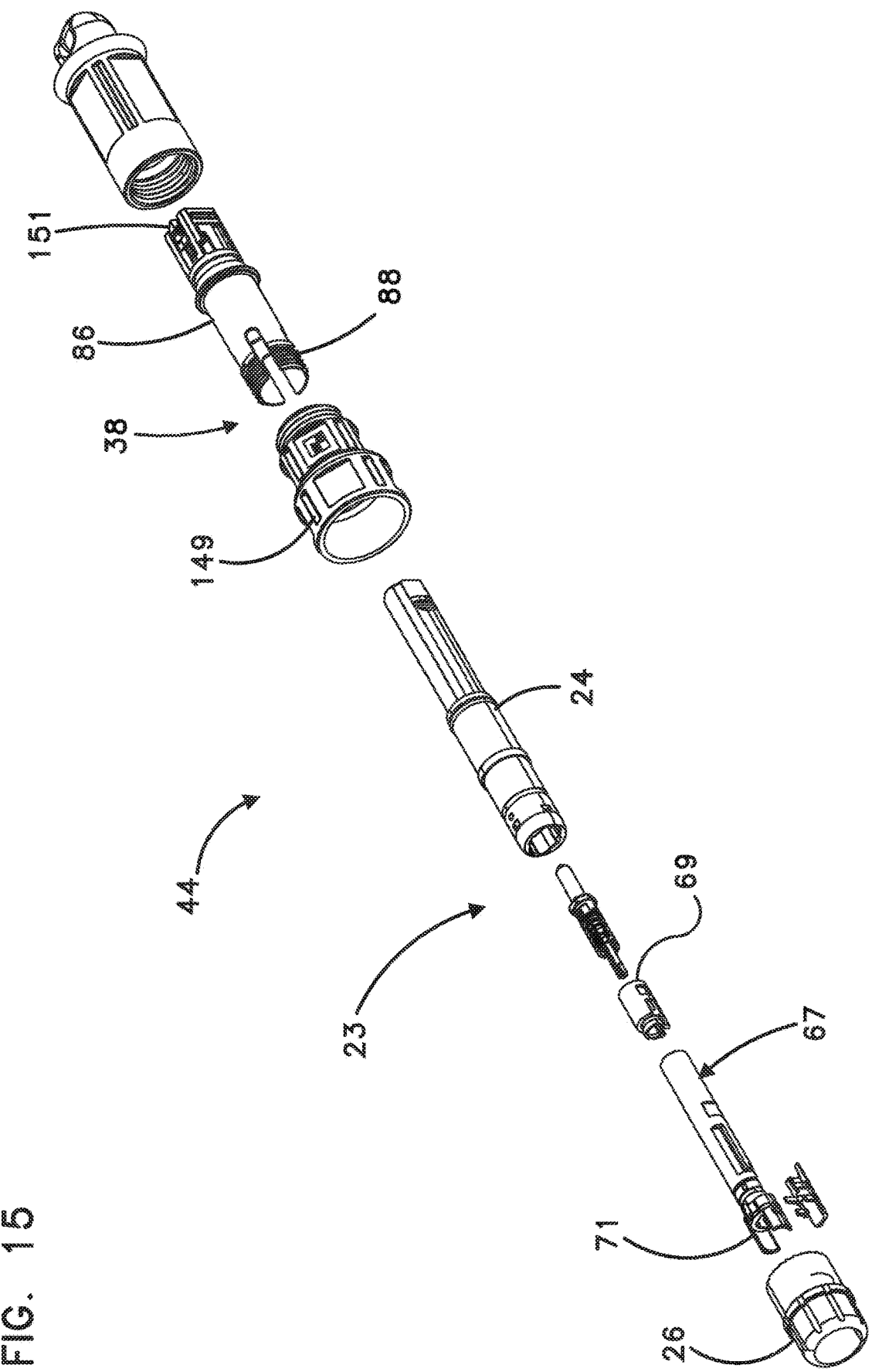
FIG. 15 is an exploded view of the third fiber optic connector assembly of FIGS. 13 and 14.

FIGS. 13-15 show the third fiber optic connector assembly 44 formed by mounting the third hardened connector shroud and fastener arrangement 38 over the connector core body 24. The third hardened connector shroud and fastener arrangement 38 includes the shroud 86 as well as a rotatable fastener 149. The seal 30 is adapted to seal against the inside of the shroud 86. The shroud 86 includes a keying element such as a rib 151. When the fiber optic connector assembly 44 is mated with its corresponding fiber optic adapter, the rib 151 ensures that the fiber optic connector assembly 44 is loaded into the fiber optic adapter at the appropriate rotational orientation. The rotatable fastener 149 is depicted as an externally threaded nut. The externally threaded nut is adapted to engage with corresponding threads of the fiber optic adapter to secure the third fiber optic connector assembly 44 within the fiber optic adapter. The rotational nut is relatively short such that the rear end of the shroud retainer 26 projects rearwardly beyond the rear end of the externally threaded nut. In this way, the shroud retainer 26 can be threaded onto the shroud 86 by grasping the boot and threading the shroud retainer 26 over the rear end of the shroud 86. As depicted at FIGS. 13 and 14, the rotatable fastener is shown engaged with a dust cap 153 for protecting the connector core body 24. Seal 87 carried by the shroud 86 seals against the dust cap 153. When it is desired to plug the fiber optic connector assembly 44 into the fiber optic adapter, the dust cap 153 is unthreaded from the rotatable fastener to expose the connector core body 24 and the shroud 86 mounted thereto. Thereafter, the third fiber optic connector assembly 44 can be inserted into the adapter and secured therein by the rotatable fastener 149. Seal 87 can provide sealing between the connector assembly 44 and the adapter.

Example Aspects of the Present Disclosure

Aspect 1: Aspect 1 relates to a fiber optic connector including first and second pieces that interconnect by mating turn-to-engage interfaces and that also include rotation locking interfaces that interlock to inhibit the turn-to-engage interfaces from disengaging from one another or to only allow disengagement by breaking portions of the turn-to-engage interfaces.

Aspect 2: Aspect 2 includes aspect 1, and wherein the turn-to-engage interfaces are threaded interfaces or bayonet-style interfaces.

Aspect 3: Aspect 3 includes any of Aspects 2-3, and wherein the rotation locking interfaces include interlocking projections that snap-fit engage with each other.

Aspect 4: Aspect 4 includes Aspect 3, and wherein the interlocking projections are knobs, ribs, rails or teeth.

Aspect 5: Aspect 5 includes Aspect 3 or 4, and wherein the projections include interlocking ratchet teeth.

Aspect 6: Aspect 6 includes any of Aspects 3-5, and wherein the interlocking projections are provided on axial end faces of the first and second pieces.

Aspect 7: Aspect 7 includes any of Aspects 3-5, and wherein the interlocking projections are provided at radially facing surfaces of the first and second pieces.

Aspect 8: Aspect 8 includes any of Aspects 1-7, and wherein the first and second pieces include a shroud or dust cap, and a retainer.

Aspect 9: Aspect 9 includes Aspect 8, and wherein the retainer is adapted to secure the shroud or dust cap to a connector core.

Aspect 10: Aspect 10 relates to a fiber optic connector including a connector component, and a strain relief boot that is mountable in first and second axial positions on the connector component.

Aspect 11: Aspect 11 includes Aspect 10, and wherein the strain relief boot engages the connector component with an interlocked engagement when in the second axial position and engages the connector component with a non-interlocked, frictional engagement.

Aspect 12: Aspect 12 includes Aspect 10 or 11, and wherein the boot is easier to rotate relative to the connector component and/or a cable corresponding to the connector component when in the first axial position as compared to the second axial position.

Aspect 13: Aspect 13 includes any of Aspects 10-12, wherein the boot includes an inner tapered portion that engages an outer tapered portion corresponding to the connector component when in the second axial position and is offset from the from the outer tapered portion when in the first axial position.

Aspect 14: Aspect 13 includes any of Aspects 10-13, wherein the boot has an outer tapered configuration for enhancing flexibility of the boot.

Aspect 15: Aspect 13 includes any of Aspects 10-14, and wherein the connector component is a connector piece as defined by any of Aspects 1-9.

What is claimed is:

1. A fiber optic connector assembly comprising:
a connector core having a front plug end positioned opposite from a rear end configured for attachment to a cable;
a shroud that mounts over the connector core, the shroud having a front end and a rear securement end, the shroud including a first rotational mechanical interface and a first rotation locking mechanical interface adjacent the rear securement end; and
a shroud retainer for retaining the shroud on the connector core, the shroud retainer mounting over the connector core and including a second rotational mechanical interface and a second rotation locking mechanical interface, wherein the second rotational mechanical interface is adapted to rotationally engage and mate with the first rotational mechanical interface to secure the shroud and the shroud retainer together, and wherein once the first and second rotational mechanical interfaces are rotationally engaged and mated, the first and second rotation locking mechanical interfaces interlock to inhibit the unintentional decoupling of the first and second rotational mechanical interfaces by inhibiting relative rotation between the first and second rotational mechanical interfaces.

2. The fiber optic connector assembly of claim 1, wherein the first and second rotational mechanical interfaces are adapted to form a bayonet-style coupling or a threaded coupling between the rear securement end of the shroud and the shroud retainer.

3. The fiber optic connector assembly of claim 1, wherein the first and second rotation locking mechanical interfaces include at least one locking member that snaps within at least one locking member receptacle when the first and second rotational mechanical interfaces are rotationally engaged and mated.

4. The fiber optic connector assembly of claim 3, wherein each of the first and second rotation locking mechanical interfaces includes a plurality of the locking members and a plurality of the locking member receptacles.

5. The fiber optic connector assembly of claim 4, wherein the locking members include ratchet teeth aligned in an arrangement that extends about a central longitudinal axis of the fiber optic connector assembly.

6. The fiber optic connector assembly of claim 5, wherein the ratchet teeth are provided at an axial end face of the rear securement end of the shroud and at an axial end face at a front end of the shroud retainer.

7. The fiber optic connector assembly of claim 4, wherein the plurality of locking members include ribs.

8. The fiber optic connector assembly of claim 7, wherein the ribs include first longitudinal ribs spaced circumferentially from one another about a central longitudinal axis of the fiber optic connector assembly.

9. The fiber optic connector assembly of claim 1, further comprising a boot that mounts on a rear end of the shroud retainer, the boot being mountable in first and second axial positions relative to the shroud retainer.

10. The fiber optic connector assembly of claim 9, wherein the boot is moved forwardly relative to the shroud retainer when moved from the first axial position to the second axial position, wherein the boot interlocks in a snap-fit relation with respect to the shroud retainer when in the second axial position, and wherein the boot frictionally engages the shroud retainer but does not interlock in a snap-fit relation with the shroud retainer when in the first axial position.

11. The fiber optic connector assembly of claim 1, wherein the fiber optic connector assembly is adapted to be fastened to a fiber optic adapter or another fiber optic connector or a dust cap, and wherein the fiber optic connector assembly further comprises a fastening member that mounts over the shroud and is rotatable relative to the shroud about a central longitudinal axis of the fiber optic connector assembly, the fastening member including a fastening interface including threads or a bayonet interface that is adapted to engage a mating fastening interface of the fiber optic adapter or other fiber optic connector or the dust cap.

12. The fiber optic connector assembly of claim 11, wherein the front end of the shroud is configured to rotationally key the fiber optic connector assembly relative to the fiber optic adapter or other fiber optic connector, and wherein the front end includes at least one keying paddle, or at least one keying slot, or at least one keying rib.

13. The fiber optic connector assembly of claim 12, wherein the fastening member can be pre-installed over the shroud, and wherein the connector core is loadable into the shroud through a rear end of the shroud and securable to the shroud by the shroud retainer while the fastening member is pre-installed over the shroud.

14. The fiber optic connector assembly of claim 13, wherein a boot retains the fastening member on the shroud after the connector core has been secured to the shroud.

15. The fiber optic connector assembly of claim 1, wherein the connector core includes a forwardly facing positive stop surface for stopping movement of the shroud in a rearward direction relative to the connector core and a rearwardly facing positive stop surface for stopping movement of the shroud retainer in a forward direction relative to the connector core.

16. The fiber optic connector assembly of claim 1, wherein the front plug end of the connector core has a form factor corresponding to an SC-connector.

17. The fiber optic connector assembly of claim 1, wherein at least a portion of the first rotation locking mechanical interface of the shroud is designed to intentionally break if the first and second rotational mechanical interfaces of the shroud and shroud retainer, respectively, are decoupled.

* * * * *